(12) United States Patent  (10) Patent No.: US 7,686,322 B2
Longenecker et al.  (45) Date of Patent: Mar. 30, 2010

(54) FOLDABLE STROLLER WITH MEMORY RECLINE

(75) Inventors: Michael L. Longenecker, Ephrata, PA (US); Bruce L. Williams, Denver, PA (US)

(73) Assignee: Chicco USA, Inc., Lancaster, PA (US)

( * ) Notice: Subject to any disclaimer, the term of this patent is extended or adjusted under 35 U.S.C. 154(b) by 899 days.

(21) Appl. No.: 11/113,781

(22) Filed: Apr. 25, 2005

(65) Prior Publication Data

US 2005/0242549 A1    Nov. 3, 2005

Related U.S. Application Data

(60) Provisional application No. 60/567,390, filed on Apr. 30, 2004.

(51) Int. Cl.
B62B 7/00 (2006.01)
(52) U.S. Cl. .................. 280/642; 280/647; 280/650; 280/657; 280/658
(58) Field of Classification Search ................. 280/642, 280/647, 650, 657, 658
See application file for complete search history.

(56) References Cited

U.S. PATENT DOCUMENTS

| | | |
|---|---|---|
| 1,598,778 A | 9/1926 | Leake |
| 1,709,527 A | 4/1929 | Ford |
| 2,616,719 A | 11/1952 | Heideman |
| 2,783,053 A | 2/1957 | Sheldrick et al. |
| 3,112,042 A | 11/1963 | Leshner |
| 3,168,330 A | 2/1965 | Smith et al. |
| 3,227,484 A | 1/1966 | Merclean |
| 3,390,893 A | 7/1968 | MacLaren |
| 3,459,435 A | 8/1969 | Garner |
| 3,504,926 A | 4/1970 | Glaser |
| 3,556,546 A | 1/1971 | Garner |
| 3,561,787 A | 2/1971 | Toda et al. |
| 3,799,567 A | 3/1974 | Toda |

(Continued)

FOREIGN PATENT DOCUMENTS

BE    818905    12/1974

(Continued)

OTHER PUBLICATIONS

Evenflo® Easy Comfort Premier™ Stroller (1999).

(Continued)

*Primary Examiner*—S. Joseph Morano
*Assistant Examiner*—Katy Meyer
(74) *Attorney, Agent, or Firm*—Volpe and Koenig, P.C.

(57) ABSTRACT

A foldable stroller which includes a frame having a front leg and right and left rear legs, right and left support rails movably coupled to a respective one of the right and left rear legs, an operator handle extending between the support rails. A locking assembly is secured to at least one of the support rails and biased toward a locking position that fixes the engagement between the support rails and the rear legs. The stroller includes a one hand folding mechanism that can be movably secured to an operator tray. The foldable stroller also includes a reclinable back having a plurality of recline positions that retains the last adjustment position when the stroller is moved between a folded and unfolded condition.

40 Claims, 24 Drawing Sheets

U.S. PATENT DOCUMENTS

| | | | | |
|---|---|---|---|---|
| 3,989,295 | A | 11/1976 | Sparkes | |
| 4,007,947 | A | 2/1977 | Perego | |
| 4,023,825 | A | 5/1977 | Kassai | |
| 4,046,401 | A | 9/1977 | Kassai | |
| 4,111,454 | A | 9/1978 | Kassai | |
| 4,126,331 | A | 11/1978 | Sloan et al. | |
| 4,191,397 | A | 3/1980 | Kassai | |
| 4,232,897 | A | 11/1980 | Maclaren et al. | |
| 4,248,443 | A | 2/1981 | Ohlson | |
| 4,317,581 | A | 3/1982 | Kassai | |
| 4,322,093 | A | 3/1982 | Otto | |
| 4,335,900 | A | 6/1982 | Fleischer | |
| 4,362,315 | A | 12/1982 | Kassai | |
| 4,378,946 | A | 4/1983 | Voytko et al. | |
| 4,412,688 | A | 11/1983 | Giordani | |
| 4,415,180 | A | 11/1983 | Payne, Jr. | |
| 4,542,915 | A | 9/1985 | Wheeler, III et al. | |
| 4,564,212 | A | 1/1986 | Orlandino et al. | |
| 4,591,176 | A | 5/1986 | Kassai | |
| 4,602,395 | A | 7/1986 | Kassai | |
| 4,606,550 | A | 8/1986 | Cone | |
| 4,610,460 | A | 9/1986 | Kassai | |
| 4,632,420 | A | 12/1986 | Miyagi | |
| 4,632,421 | A | 12/1986 | Shamie | |
| 4,660,850 | A | 4/1987 | Nakao et al. | |
| 4,706,986 | A | 11/1987 | Kassai | |
| 4,733,882 | A | 3/1988 | Kassai | |
| 4,741,056 | A | 5/1988 | Kassai | |
| 4,741,551 | A | 5/1988 | Perego | |
| 4,763,911 | A | 8/1988 | Gebhard et al. | |
| 4,763,919 | A | 8/1988 | Nakao et al. | |
| 4,768,795 | A | 9/1988 | Mar | |
| 4,770,437 | A | 9/1988 | Gläser | |
| 4,807,928 | A | 2/1989 | Cone | |
| 4,817,982 | A | 4/1989 | Kassai | |
| 4,819,958 | A | 4/1989 | Perego | |
| 4,832,361 | A | 5/1989 | Nakao et al. | |
| 4,856,809 | A | 8/1989 | Kohus et al. | |
| 4,886,289 | A | 12/1989 | Yee et al. | |
| 4,892,327 | A | 1/1990 | Cabagnero | |
| 4,906,017 | A | 3/1990 | Kassai | |
| 4,907,818 | A | 3/1990 | Chai | |
| 4,924,725 | A | 5/1990 | Takahashi et al. | |
| D308,656 | S | 6/1990 | Takahashi et al. | |
| 4,930,697 | A | 6/1990 | Takahashi et al. | |
| D310,645 | S | 9/1990 | Julien | |
| 4,953,887 | A | 9/1990 | Takahashi et al. | |
| 4,968,092 | A | 11/1990 | Giambrone | |
| D317,280 | S | 6/1991 | Takahashi et al. | |
| 5,028,061 | A | 7/1991 | Hawkes | |
| 5,056,805 | A | 10/1991 | Wang | |
| 5,074,575 | A | 12/1991 | Bigo | |
| 5,087,066 | A | 2/1992 | Mong-Hsing | |
| 5,110,150 | A | 5/1992 | Chen | |
| 5,143,398 | A | 9/1992 | Teng | |
| 5,181,735 | A | 1/1993 | Onishi | |
| 5,184,835 | A | 2/1993 | Huang | |
| 5,201,535 | A | 4/1993 | Kato et al. | |
| 5,205,577 | A | 4/1993 | Liu | |
| 5,205,579 | A | 4/1993 | Kato et al. | |
| 5,238,292 | A | 8/1993 | Golenz et al. | |
| 5,244,228 | A | 9/1993 | Chiu | |
| 5,246,272 | A | 9/1993 | Kato et al. | |
| 5,257,799 | A | 11/1993 | Cone et al. | |
| 5,362,089 | A | 11/1994 | Jyan-Tsai | |
| 5,388,852 | A | 2/1995 | Bigo et al. | |
| D357,439 | S | 4/1995 | Haut et al. | |
| 5,417,450 | A | 5/1995 | Wang | |
| 5,427,402 | A | 6/1995 | Huang | |
| 5,431,478 | A | 7/1995 | Noonan | |
| 5,454,584 | A | 10/1995 | Haut et al. | |
| 5,460,395 | A | 10/1995 | Chen | |
| 5,460,398 | A | 10/1995 | Huang | |
| 5,472,224 | A | 12/1995 | Cabagnero | |
| 5,478,102 | A | 12/1995 | Haung | |
| 5,489,138 | A | 2/1996 | Mariol et al. | |
| 5,511,259 | A | 4/1996 | Tarara | |
| 5,511,441 | A | 4/1996 | Arai | |
| 5,524,503 | A | 6/1996 | Ishikura | |
| 5,527,090 | A | 6/1996 | Cone, II | |
| 5,605,409 | A | 2/1997 | Haut et al. | |
| 5,622,377 | A | 4/1997 | Shamie | |
| 5,645,293 | A | 7/1997 | Cheng | |
| 5,664,795 | A | 9/1997 | Haung | |
| 5,669,623 | A | 9/1997 | Onishi | |
| 5,669,624 | A * | 9/1997 | Eichhorn | 280/642 |
| 5,676,386 | A | 10/1997 | Huang | |
| 5,718,444 | A | 2/1998 | Huang | |
| 5,722,682 | A * | 3/1998 | Wang | 280/642 |
| 5,727,798 | A | 3/1998 | Walters et al. | |
| 5,752,738 | A * | 5/1998 | Onishi et al. | 297/61 |
| 5,765,855 | A | 6/1998 | Chiu | |
| 5,765,856 | A | 6/1998 | Kiser | |
| 5,769,447 | A | 6/1998 | Huang | |
| 5,772,235 | A * | 6/1998 | Espenshade | 280/643 |
| 5,775,718 | A | 7/1998 | Huang | |
| 5,795,091 | A | 8/1998 | Kakuda et al. | |
| 5,810,432 | A | 9/1998 | Haut et al. | |
| 5,845,666 | A | 12/1998 | Messner | |
| 5,845,924 | A | 12/1998 | Huang | |
| 5,876,057 | A | 3/1999 | Huang | |
| 5,887,935 | A | 3/1999 | Sack | |
| 5,921,571 | A | 7/1999 | Bell | |
| 5,934,757 | A | 8/1999 | Smith | |
| 5,938,229 | A * | 8/1999 | Chen et al. | 280/642 |
| 5,947,555 | A | 9/1999 | Welsh, Jr. et al. | |
| 5,979,928 | A | 11/1999 | Kuo | |
| 5,988,669 | A | 11/1999 | Freese et al. | |
| 5,988,670 | A * | 11/1999 | Song et al. | 280/648 |
| D419,113 | S | 1/2000 | Everett | |
| D421,940 | S | 3/2000 | Gibson et al. | |
| 6,068,284 | A | 5/2000 | Kakuda | |
| 6,070,890 | A | 6/2000 | Haut et al. | |
| D427,822 | S | 7/2000 | Greger | |
| 6,102,431 | A | 8/2000 | Sutherland et al. | |
| D431,213 | S | 9/2000 | Yang | |
| 6,116,624 | A | 9/2000 | Hu | |
| 6,139,046 | A | 10/2000 | Aalund et al. | |
| 6,152,476 | A | 11/2000 | Huang | |
| 6,155,740 | A | 12/2000 | Hartenstine | |
| 6,189,914 | B1 | 2/2001 | Worth et al. | |
| 6,273,451 | B1 | 8/2001 | Julien et al. | |
| 6,286,844 | B1 | 9/2001 | Cone, II et al. | |
| 6,296,004 | B1 | 10/2001 | Gordon | |
| 6,299,194 | B1 * | 10/2001 | Chen | 280/642 |
| 6,302,613 | B1 | 10/2001 | Lan | |
| 6,339,862 | B1 | 1/2002 | Cheng | |
| 6,368,006 | B1 | 4/2002 | Yang et al. | |
| 6,409,205 | B1 | 6/2002 | Bapst et al. | |
| 6,412,809 | B1 * | 7/2002 | Bigo et al. | 280/642 |
| 6,443,261 | B1 | 9/2002 | Gibson et al. | |
| 6,443,479 | B2 * | 9/2002 | Huang | 280/642 |
| 6,478,327 | B1 * | 11/2002 | Hartenstine et al. | 280/642 |
| 6,557,885 | B1 | 5/2003 | Kakuda | |
| 6,572,134 | B2 | 6/2003 | Barrett et al. | |
| 6,581,957 | B1 * | 6/2003 | Lan | 280/642 |
| 6,666,473 | B2 | 12/2003 | Hartenstine et al. | |

FOREIGN PATENT DOCUMENTS

| | | |
|---|---|---|
| DE | 34 07 241 | 2/1984 |
| DE | 35 25 834 | 7/1985 |
| DE | 38 30 752 A 1 | 9/1988 |
| DE | 40 22 391 C 1 | 7/1990 |

| | | | |
|---|---|---|---|
| DE | 42 29 857 A 1 | 9/1992 |
| DE | 195 43 273 A 1 | 11/1995 |
| DE | 196 15 901 A 1 | 4/1996 |
| DE | 196 38 097 A 1 | 9/1996 |
| DE | 198 33 857 | 7/1997 |
| DE | 198 33 115 A 1 | 7/1998 |
| DE | 299 00 901 U 1 | 1/1999 |
| DE | 200 01 963 U 1 | 4/2000 |
| DE | 200 01 964 U 1 | 4/2000 |
| DE | 200 02 027 U 1 | 4/2000 |
| EP | 0 422 812 A1 | 10/1990 |
| EP | 0 639 489 A2 | 8/1994 |
| EP | 0 719 693 A2 | 11/1995 |
| EP | 0 897 848 A1 | 8/1998 |
| EP | 0 901 953 | 3/1999 |
| EP | 0 997 367 A2 | 8/1999 |
| EP | 0 994 004 | 4/2000 |
| EP | 1 153 817 | 11/2001 |
| EP | 1 170 193 | 1/2002 |
| EP | 1 160 145 | 12/2004 |
| ES | 2 016 525 | 8/1989 |
| ES | 2 069 458 | 9/1992 |
| FR | 2 089 832 | 4/1971 |
| FR | 2 244 348 | 9/1973 |
| FR | 2 267 918 | 4/1974 |
| FR | 2 257 482 | 1/1975 |
| FR | 2 323 563 | 9/1975 |
| FR | 2 667 512 | 10/1990 |
| FR | 2 767 509 | 8/1998 |
| GB | 690115 | 5/1950 |
| GB | 1176516 | 7/1967 |
| GB | 1394564 | 12/1973 |
| GB | 1510312 | 9/1974 |
| GB | 1561594 | 10/1976 |
| GB | 2124556 | 6/1982 |
| GB | 2186793 | 2/1987 |
| GB | 2197784 A | 6/1988 |
| GB | 2225557 A | 12/1988 |
| GB | 2244029 A | 3/1990 |
| GB | 2268394 A | 5/1992 |
| GB | 2318099 A | 10/1996 |
| GB | 2324510 A | 3/1998 |
| GB | 2342897 A | 10/1999 |
| IT | 1233953 | 1/1989 |
| JP | 10-35506 | 2/1989 |
| NL | 1009312 | 6/1998 |
| PT | 84257 | 2/1987 |
| PT | 96087 | 12/1990 |
| SU | 1156949 | 4/1983 |
| WO | 93/07039 | 4/1993 |
| WO | 99/50123 | 10/1999 |
| WO | 00/06437 | 2/2000 |
| WO | 01/28840 | 10/2000 |

OTHER PUBLICATIONS

Evenflo® Light & Easy™ Stroller (1999).
Evenflo® Easy Comfort Classic™ Travel System (1999).
Evenflo® Easy Comfort Plus™ Travel System (1999).
Evenflo® Easy Comfort Premier™ Travel System (1999).

* cited by examiner

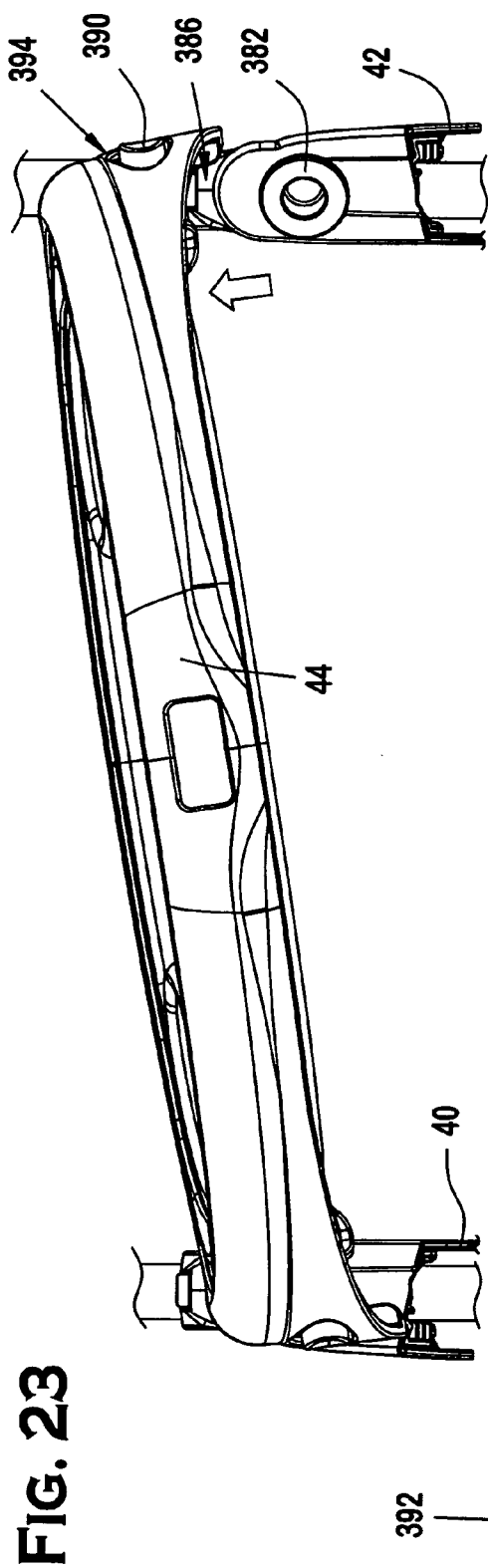
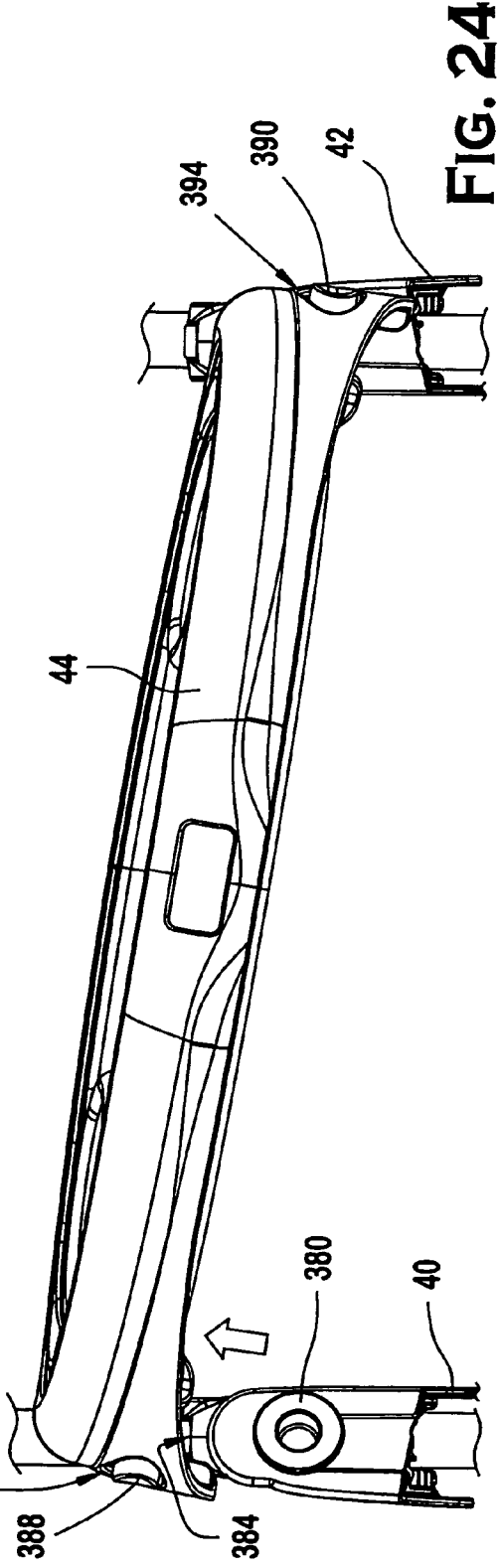
FIG. 23
FIG. 24

FOLDABLE STROLLER WITH MEMORY RECLINE

CROSS REFERENCE TO RELATED APPLICATION

This application claims the benefit of U.S. provisional application No. 60/567,390, filed on Apr. 30, 2004, which is incorporated by reference as if fully set forth herein.

FIELD OF INVENTION

The present invention relates generally to child strollers. More particularly, the present invention relates to a foldable stroller having a folding control mechanism that is pivotally secured to at the rear of the stroller. The present invention also relates to a foldable stroller having a reclinable back support assembly that retains the last adjustment position when the stroller is moved between folded and unfolded condition.

BACKGROUND

Foldable strollers are well known in the art. In many foldable strollers the folding mechanism is difficult to operate or cannot be operated using one hand. Therefore, there is a need for a more user friendly foldable stroller which has a folding mechanism that can be operated using one hand.

Foldable strollers having reclinable seatback supports are also well known in the art. However, there is a need for a foldable stroller having a reclinable seatback support that retains the last adjustment position when the stroller is moved between a folded and unfolded condition.

There is also a need for a stroller having a removable or pivotable child's tray to assist the placement of a child in the stroller or removal of a child from the stroller. In addition, there is a need for a removable child's tray insert to assist cleaning the child's tray.

SUMMARY

One aspect of the present invention is directed to a foldable stroller. The foldable stroller includes a foldable stroller frame defining front and rear ends and right and left sides. The frame includes at least one front leg and right and left rear legs, each leg having a wheel mounted thereto, and an operator handle having right and left support rails, the right and left support rails being pivotally coupled to a respective one of the right and left rear legs. The stroller further includes at least one locking assembly secured to at least one of the right and left support rails. The locking assembly is biased toward a locking position to secure the pivotal engagement between the right and left support rails and the right and left rear legs. An upper tray is mounted to the right and left support rails, and an actuator control is pivotally coupled to the upper tray and connected to the locking assembly. The actuator control is adapted to unlock the locking assembly for the right and left rear legs to pivot about the right and left support rails to fold the stroller.

Another aspect of the present invention is directed toward a foldable stroller frame. The foldable stroller frame includes a front leg and right and left rear legs, right and left support rails movably coupled to a respective one of the right and left rear legs, an operator handle extending between the support rails, a locking assembly secured to one of the support rails and biased toward a locking position that fixes the engagement between the support rails and the rear legs, an upper tray mounted between the right and left support rails, and an actuator movably connected to the upper tray and linked to the locking assembly. The actuator moves between first and second positions and controls the locking and unlocking of the locking assembly.

Another aspect of the present invention is directed to a foldable stroller. The foldable stroller includes a foldable frame and a reclinable back support. The foldable frame includes a front leg and right and left rear legs, right and left support rails movably coupled to a respective one of the right and left rear legs, an operator handle extending between the support rails, a locking assembly secured to one of the support rails and biased toward a locking position that fixes the engagement between the support rails and the rear legs, an upper tray mounted between the right and left support rails, and an actuator movably connected to the upper tray and linked to the locking assembly. The actuator moves between first and second positions and controls locking and unlocking of the locking assembly. The reclinable back support is movably secured to the frame and includes a curved support surface that includes a plurality of grooves corresponding to a plurality of recline positions for the seat back, and at least one locking member biased toward engagement with one of the plurality of grooves that retains its last engagement position when the frame is moved between a folded and unfolded configuration.

Another aspect of the present invention is directed toward a foldable stroller frame. The foldable stroller frame comprises a front leg and right and left rear legs, right and left support rails movably coupled to a respective one of the right and left rear legs, an operator handle extending between the support rails, a seat secured to at least one of the support rails and rear legs, a reclinable back support movably secured to the frame and having a curved support surface that includes a plurality of grooves that define a plurality of recline positions for the seat back, and a locking member biased toward engagement with one of the plurality of grooves that retains its last engagement position as the frame is moved between a folded and an unfolded condition.

BRIEF DESCRIPTION OF THE DRAWINGS

The foregoing summary, as well as the following detailed description of preferred embodiments of the invention, will be better understood when read in conjunction with the appended drawings. In the drawings:

FIG. 23 and 24 illustrate the child tray of the stroller in various partially disengaged conditions.

DETAILED DESCRIPTION OF THE PREFERRED EMBODIMENTS

Certain terminology is used in the following description for convenience only and is not limiting. The words "right," "left," "bottom," "side," "front," "rear," "central," "upper," and "lower" designate positions in the attached drawings. The words "inwardly" and "outwardly" refer to directions toward and away from, respectively, the geometric center of the stroller and designated parts thereof.

With reference to FIGS. 1-26, wherein like numerals indicate like elements throughout, preferred embodiments of the invention will be described below.

Figure 1:
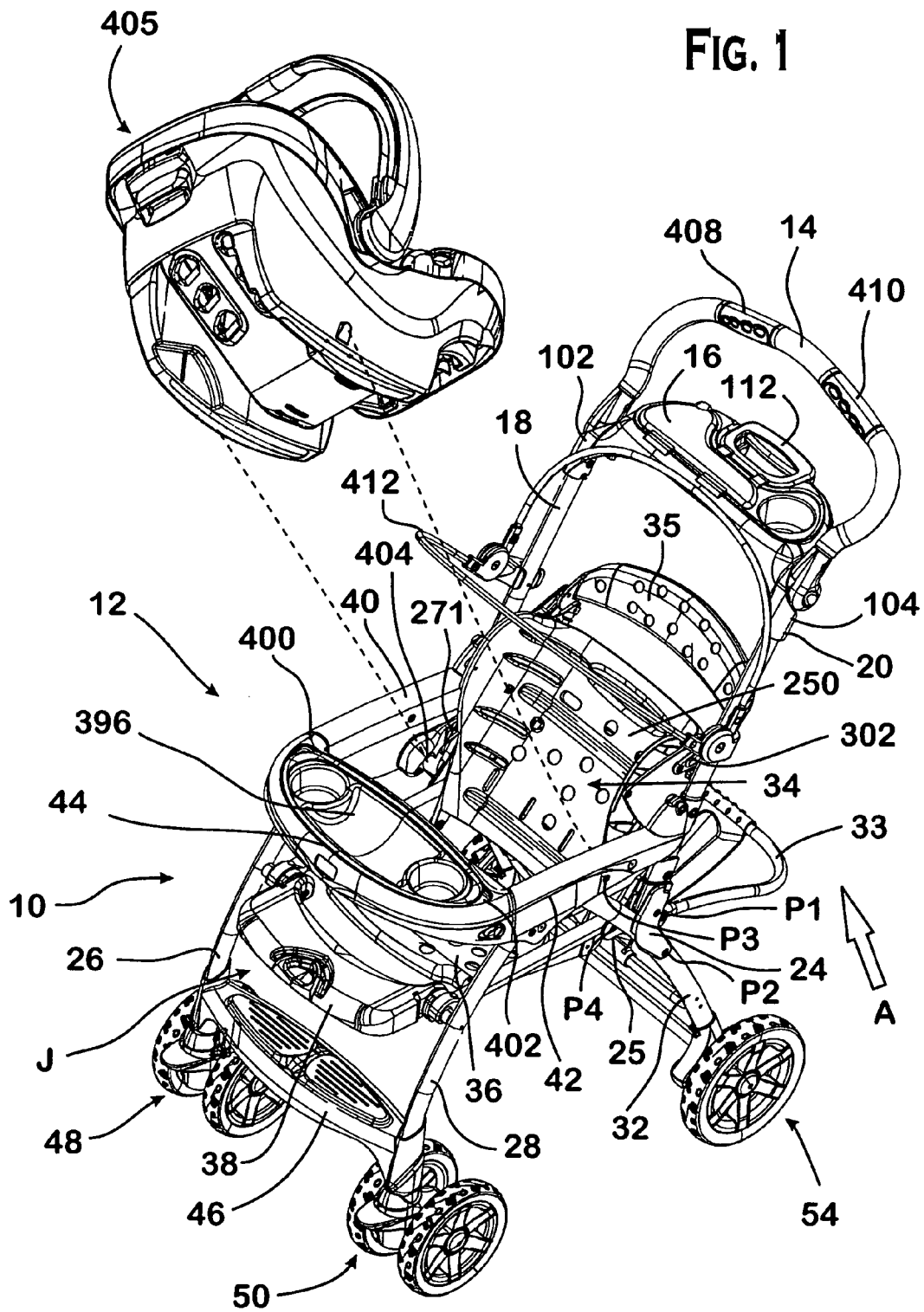
FIG. 1 is a perspective view of the stroller of the present invention with a complimentary infant travel seat illustrating the points of engagement between the two.
Figure 2:
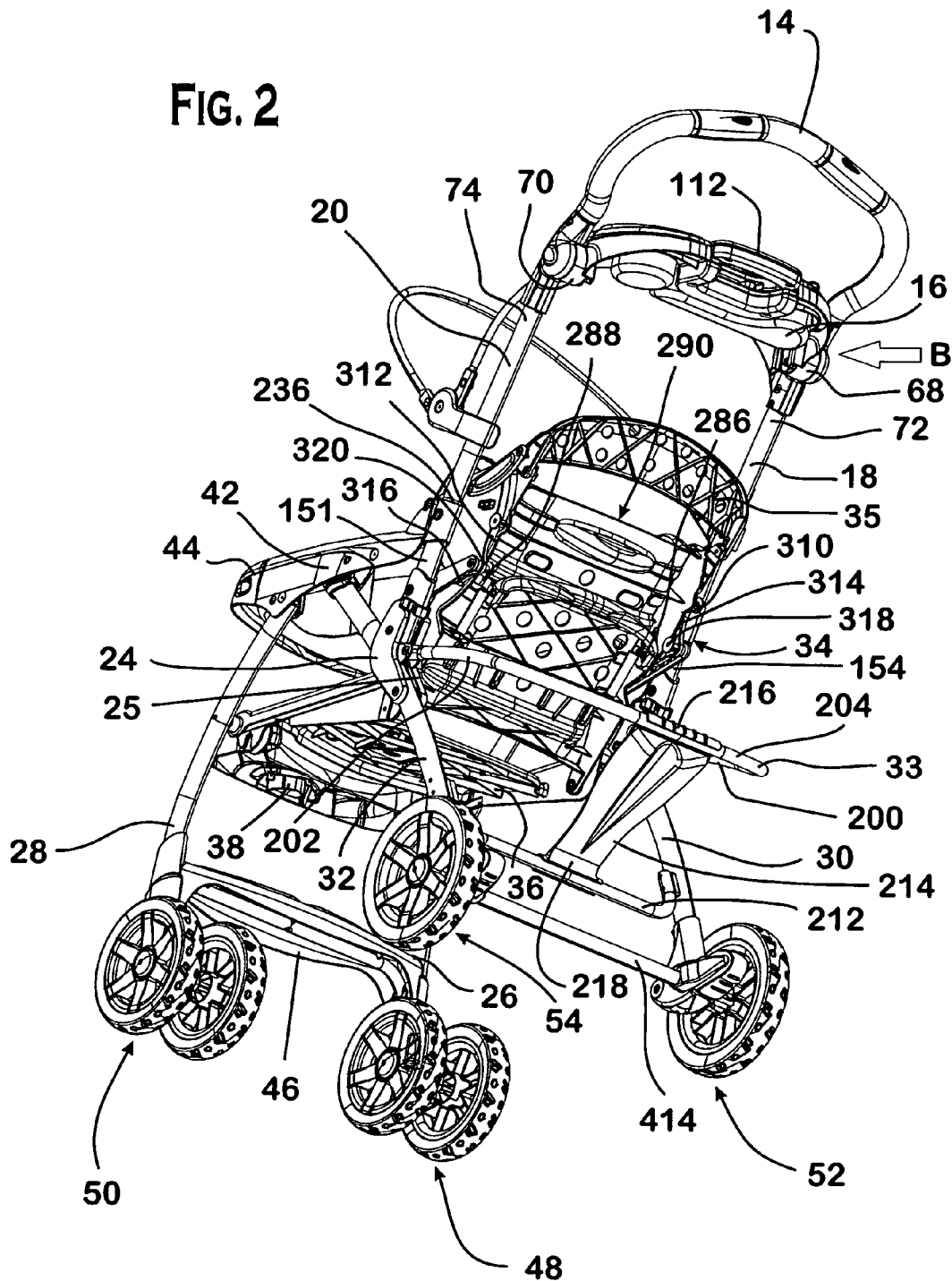
FIG. 2 is a perspective view of the stroller of FIG. 1 in the direction of arrow A in FIG. 1.
Figure 13:
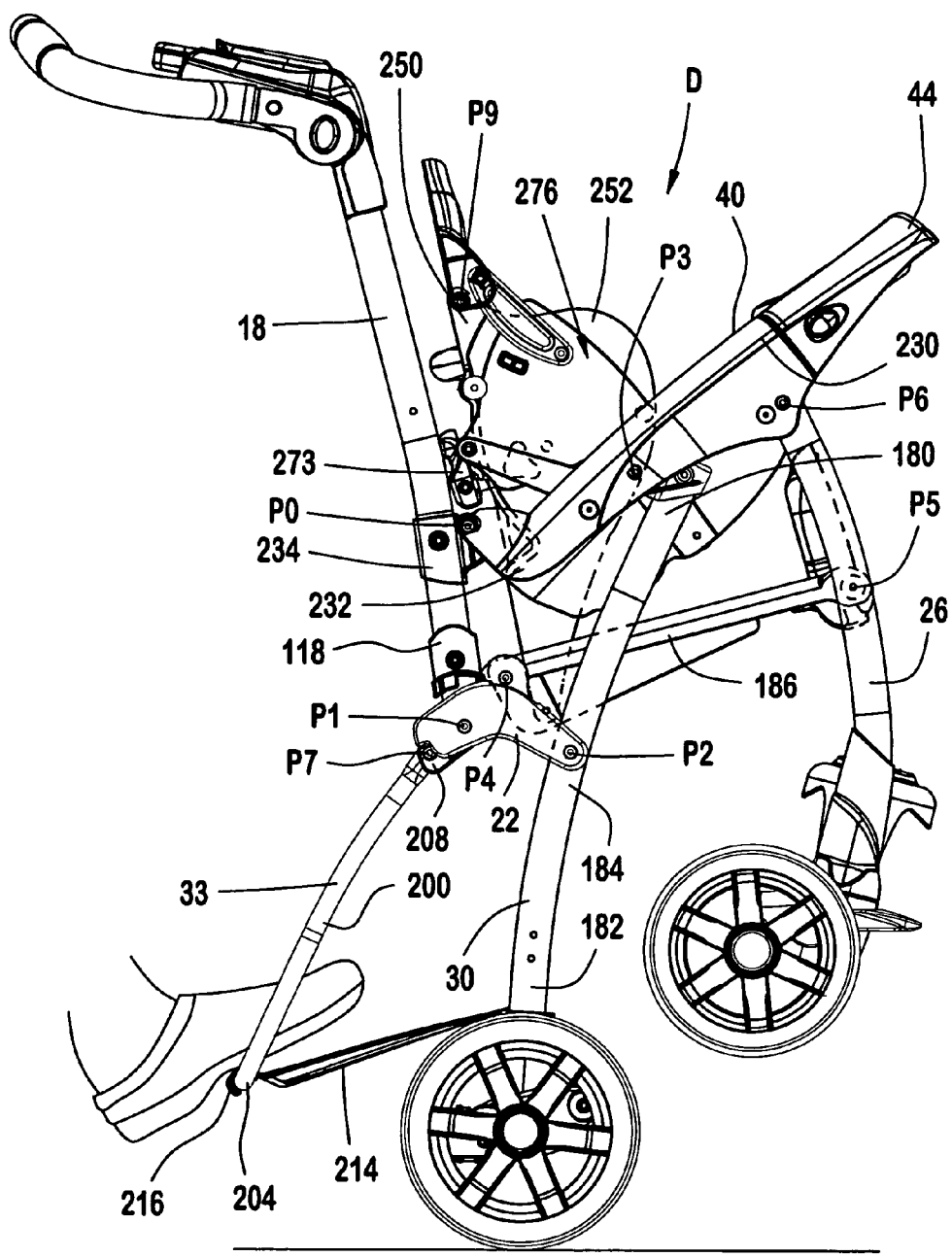
FIG. 13 is a right side view showing the stroller in a partially folded condition.
Figure 14:
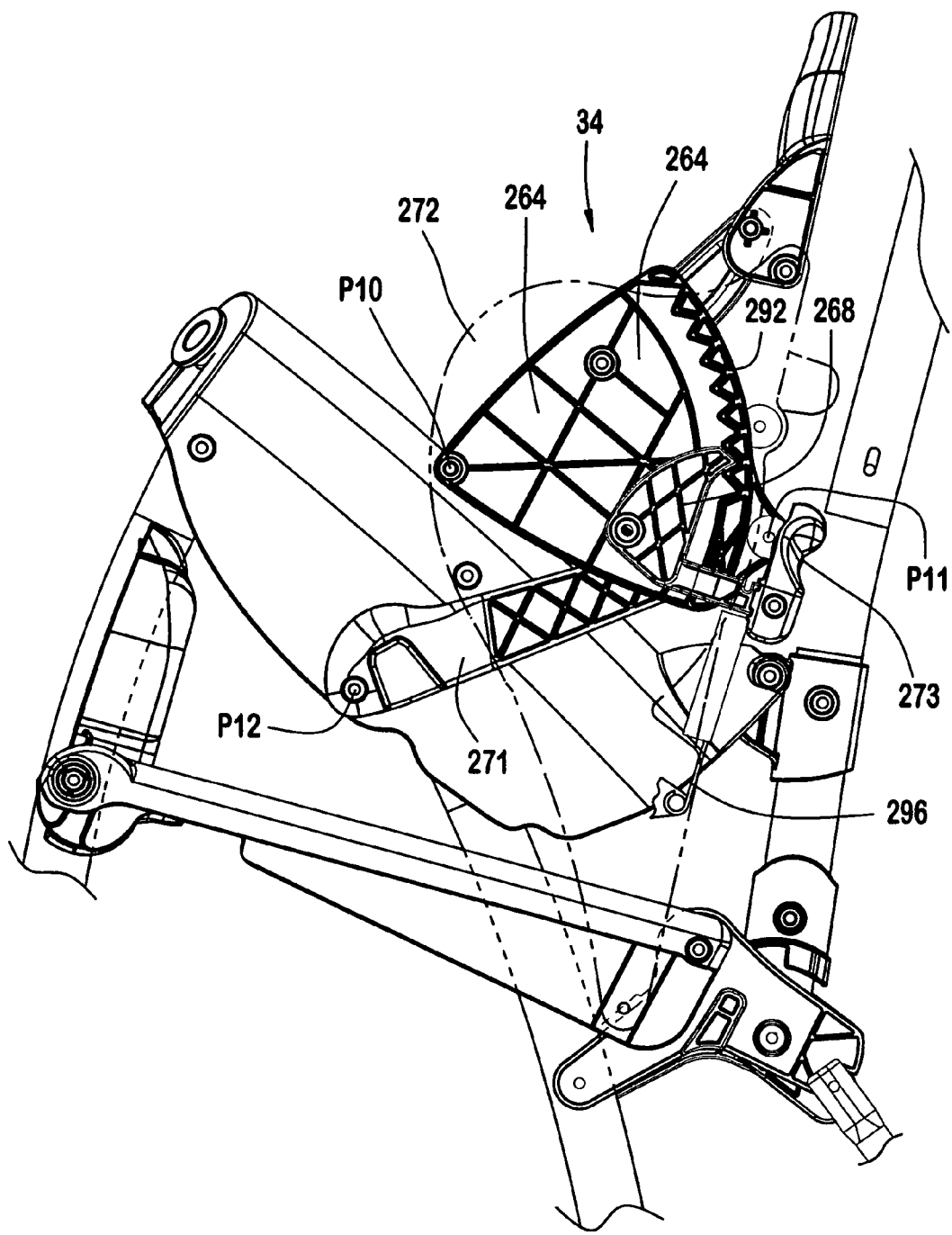
FIG. 14 is a fragmentary side view from the perspective of arrow D in FIG. 13 with the seat back member in phantom to show the back support assembly of the interior right side with the right side pivot connections in the partially folded condition.
Figure 15:
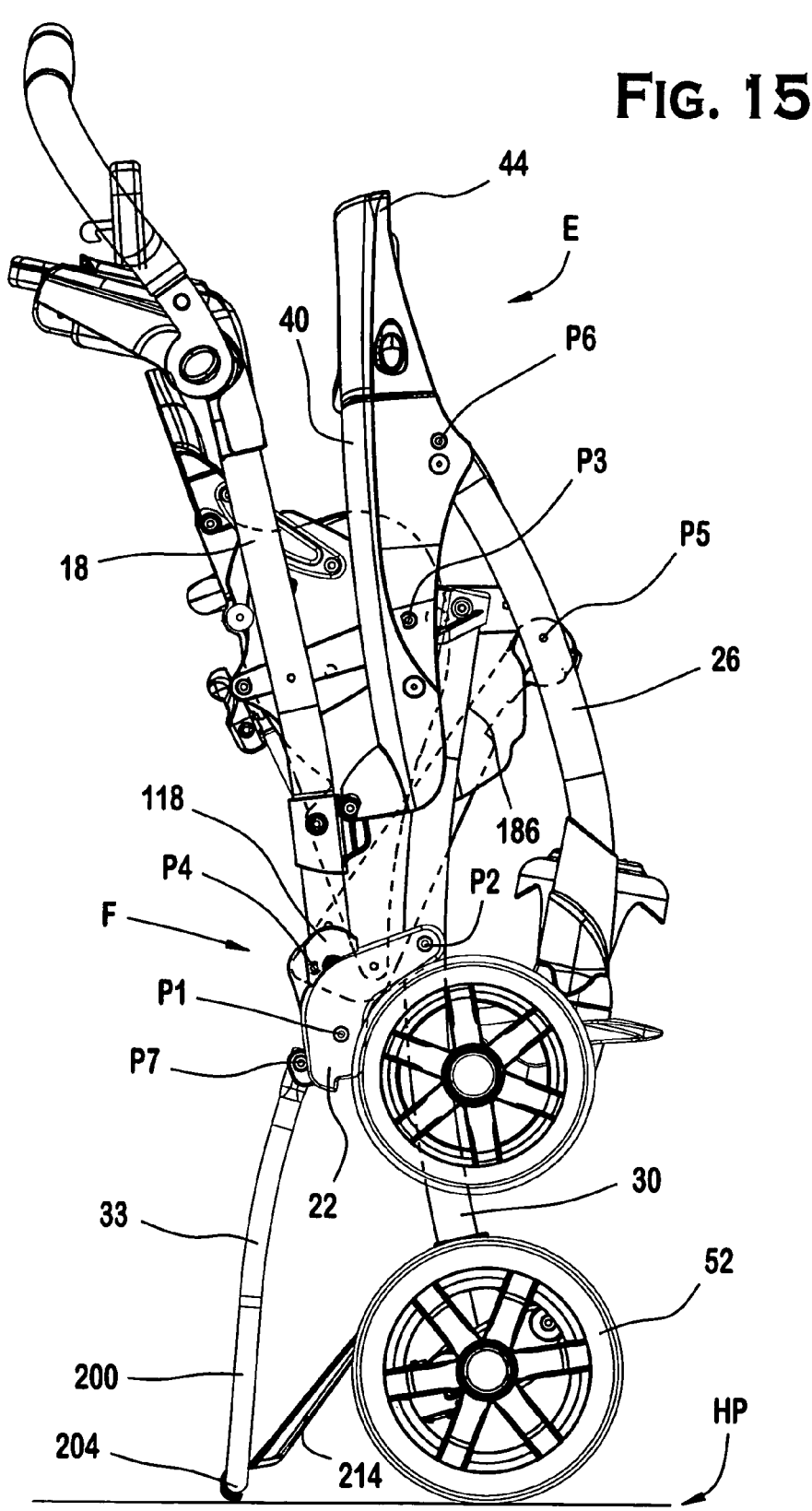
FIG. 15 is a right side view showing the stroller in a completely folded condition.
Figure 16:
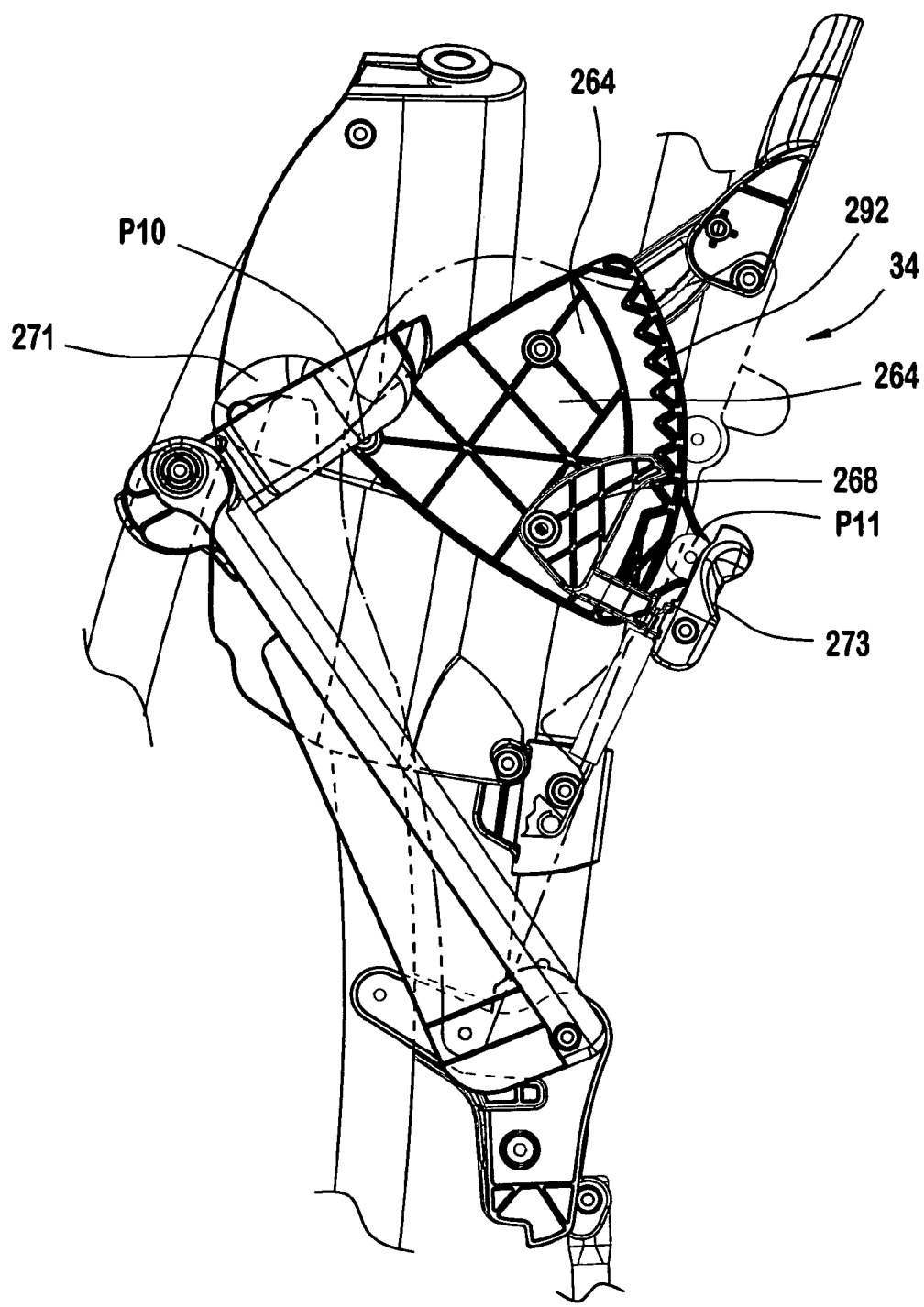
FIG. 16 is a fragmentary side view from the perspective of arrow E in FIG. 15 with the seat back member in phantom to show the back support assembly of the interior right side with the right side pivot connections in the completely folded condition.

The foldable stroller 10 of the present invention generally includes a frame 12 that is configured to be converted between an operating condition (FIGS. 1 and 2) and a folded condition (FIGS. 13-15). Referring to FIGS. 1 and 2, the stroller frame 12 preferably consists of a operator handle 14, operator tray 16, right and left handle support rails 18, 20, right outer 22 and inner 23 rail connectors, left outer 24 and inner 25 rail connectors, leg rails 26, 28, 30, 32, U-shaped cross-member 33, reclinable back support assembly 34, head support 35, seat 36, leg support 38, right and left side arms 40, 42, child tray 44, and foot rest 46. Wheel assemblies 48, 50, 52, 54, are connected to the bottom portion of leg rails 26, 28, 30, 32, respectively.

Figure 3:
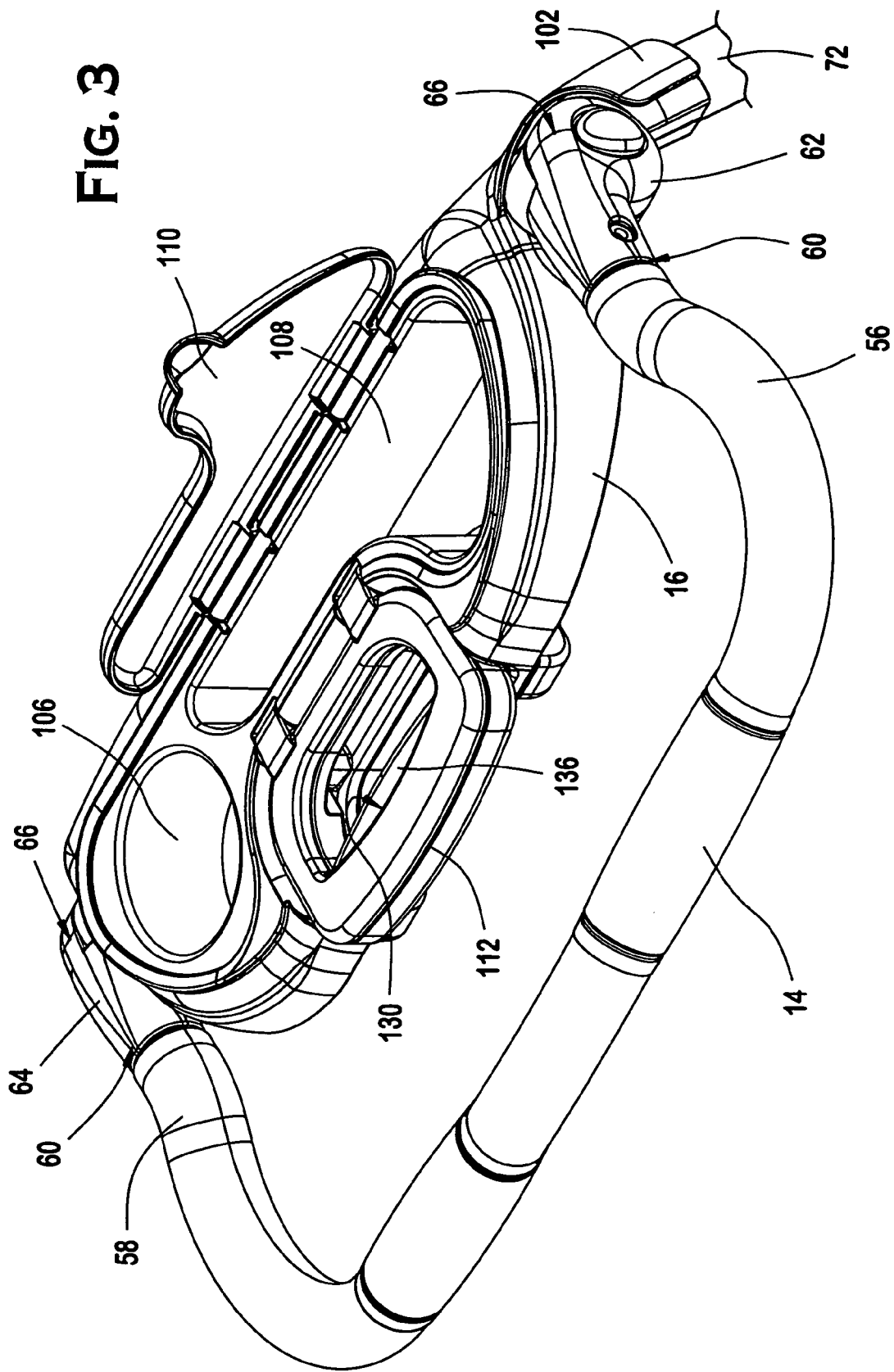
FIG. 3 is a perspective view of the operator handle and operator tray showing the stroller folding control mechanism.

Referring to FIG. 3, the operator handle 14 is a substantially U-shaped tubular structure having right and left arms 56, 58 connected to a first end 60 of pivotable attachment assemblies 62, 64. A second end 66 of each pivotable attachment assembly 62, 64 is pivotally secured to complimentary right and left hub assemblies 68, 70 mounted to an upper portion 72, 74 of each handle support rail 18, 20.

Figure 4:
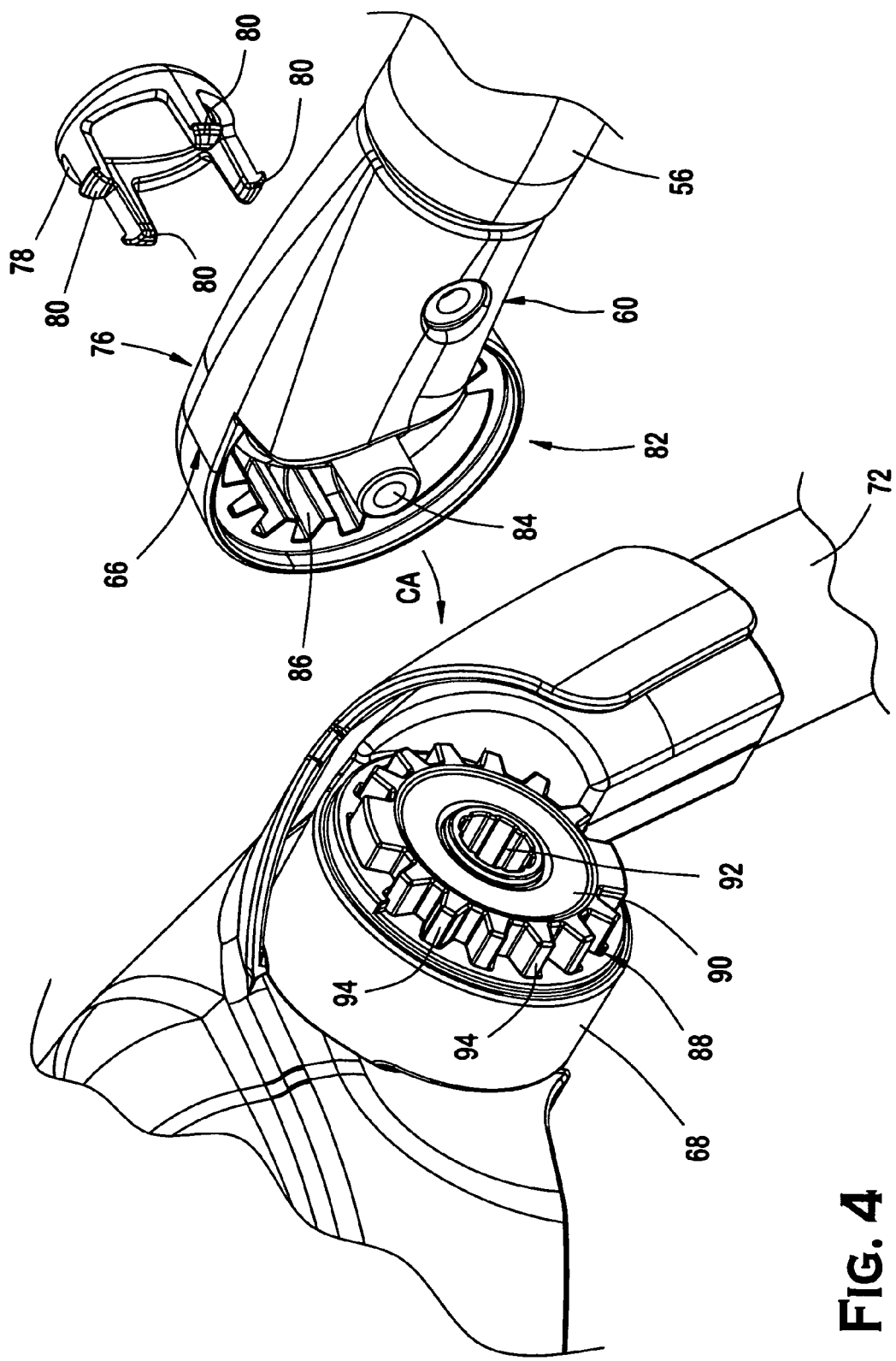
FIG. 4 is an exploded view of one of the attachments between the operator handle and stroller frame from the perspective of arrow B in FIG. 2.
Figure 5:
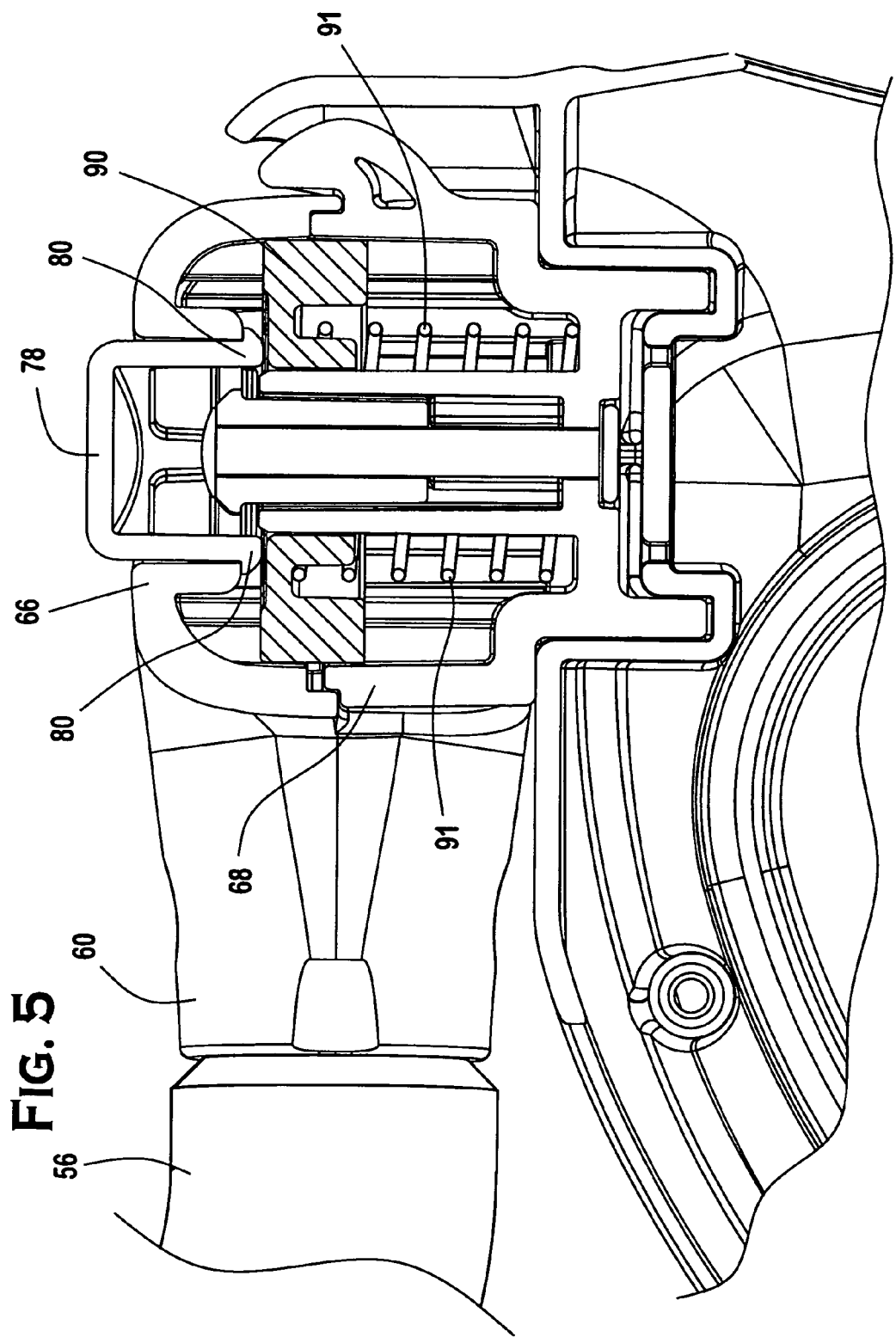
FIG. 5 is a sectional view of an assembled attachment between the operator handle and stroller frame.

The attachment between pivotable attachment assembly 62 and right hub assembly 68 will be discussed with reference to FIGS. 4 and 5; however, the attachment between attachment assembly 64 and left hub assembly 70 is the mirror image, so only one is described. The exterior surface 76 of the second end 66 of pivotable attachment assembly 72 is configured to receive a control button 78 having one or more legs 80 that project toward the interior facing portion 82 of the second end 66 of the pivotable attachment assembly 62. The interior 82 of second end 66 of the pivotable attachment assembly 62 includes a central tubular projection 84 aligned on a central axis CA and a plurality of radially spaced grooves 86. Right hub assembly 68 includes a recess 88 to receive a locking member 90. Locking member 90 is biased by one or more springs 91 away from recess 88 (FIG. 5). Locking member 90 includes a central aperture 92 that receives tubular projection 84 and a plurality of radially spaced teeth 94 that engage the complimentary grooves 86 when attachment assembly 62 is secured to hub assembly 68. As shown in FIG. 5, when pivotable attachment assembly 62 is secured to hub assembly 68, legs 80 of control button 78 are opposed to locking member 90. Depressing button 78 causes locking member 90 to move along the central axis CA toward recess 88, and release the engagement between radial teeth 94 and grooves 86. This permits adjustment of handle 14 in a plurality of positions. The operator handle 14 is rotatable to be substantially parallel to the right and left handle support rails 18, 20 when the stroller 10 is in the folded condition.

Figure 6:
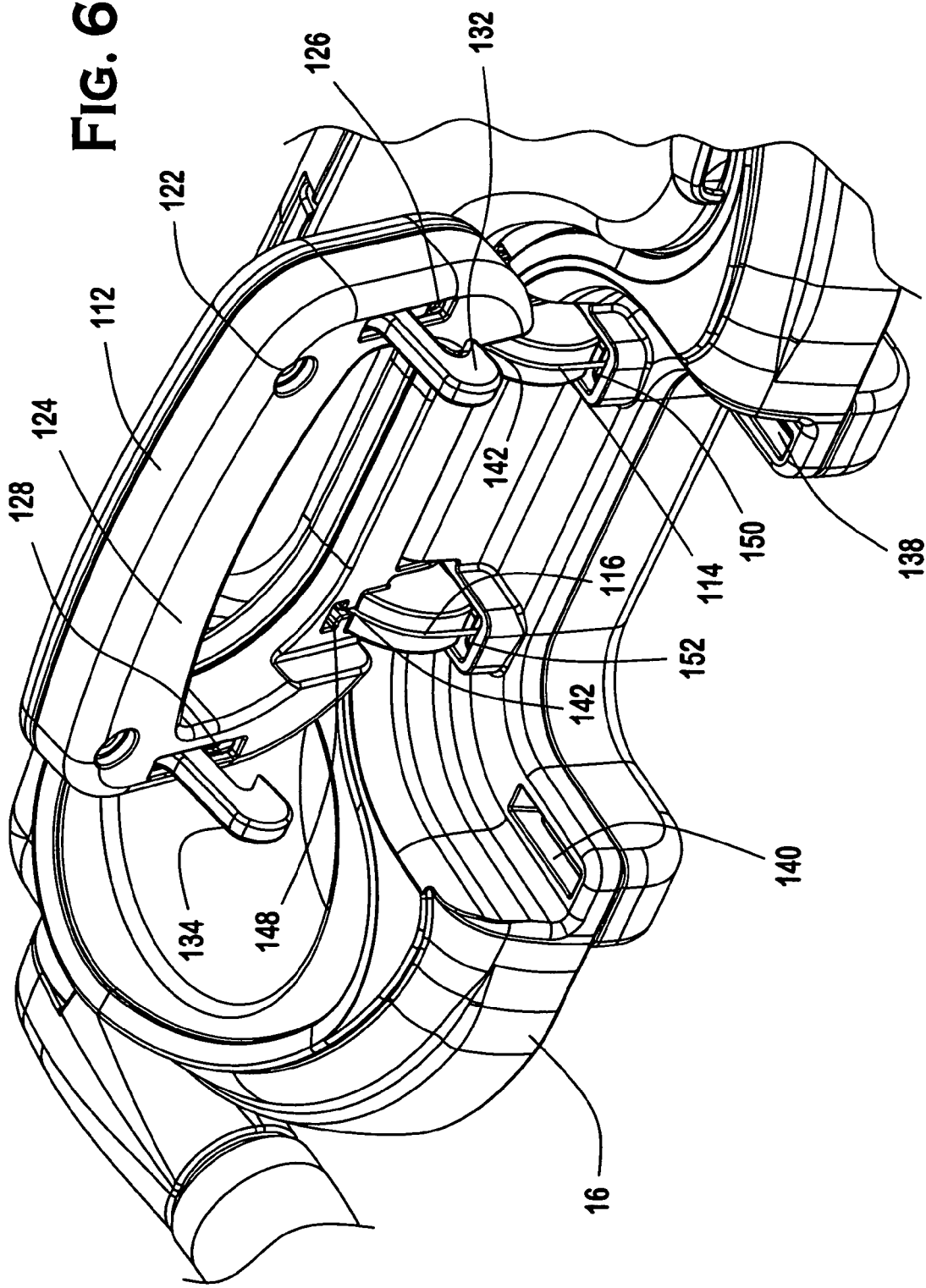
FIG. 6 is a fragmentary view of the operator tray illustrating the handle actuator pivoted away from the operator tray.
Figure 7:
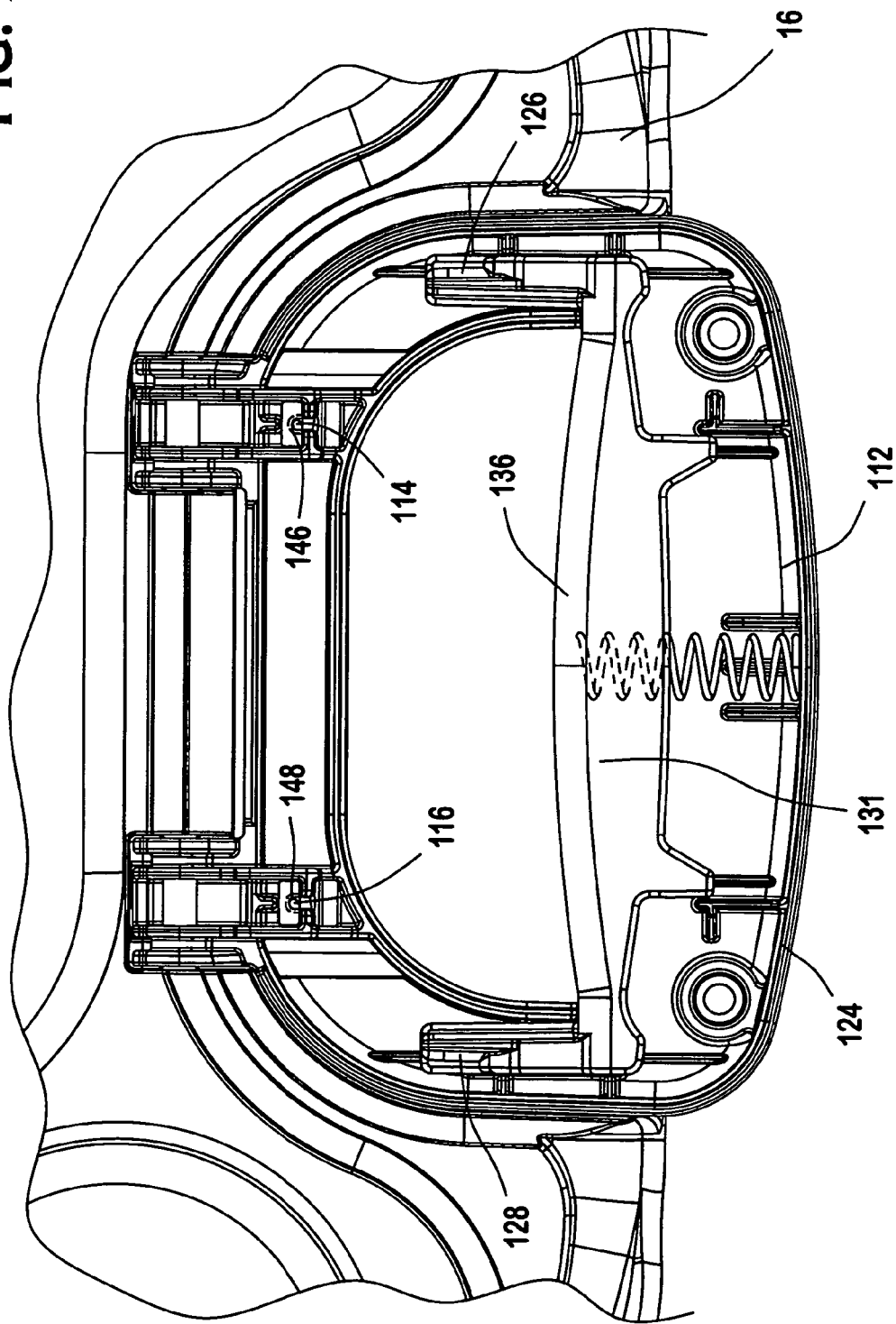
FIG. 7 is a fragmentary view of the handle actuator with the upper surface of the handle actuator removed.
Figure 8:
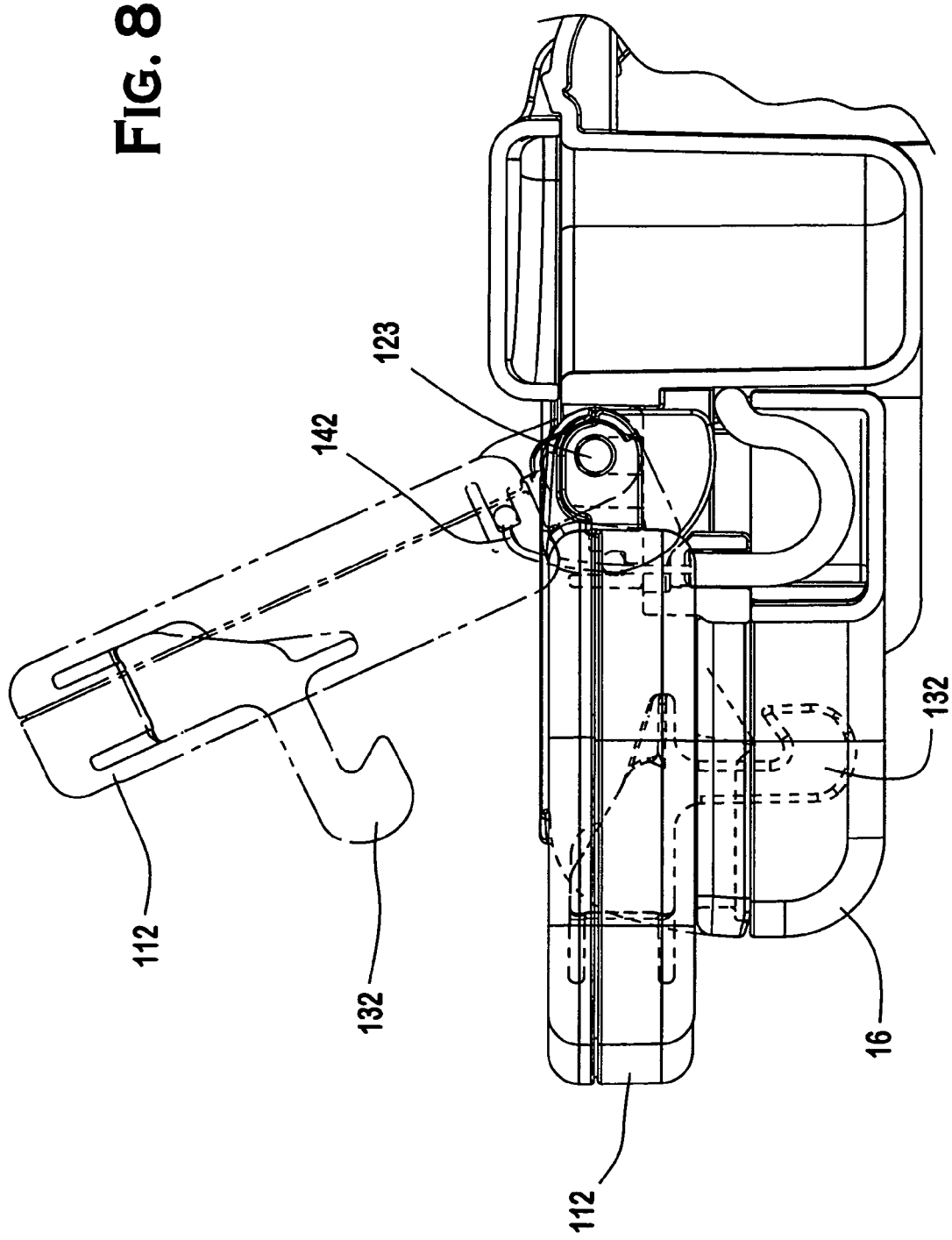
FIG. 8 is a fragmentary side view of the operator tray illustrating the handle actuator in the engaged position and disengaged position.
Figure 9:
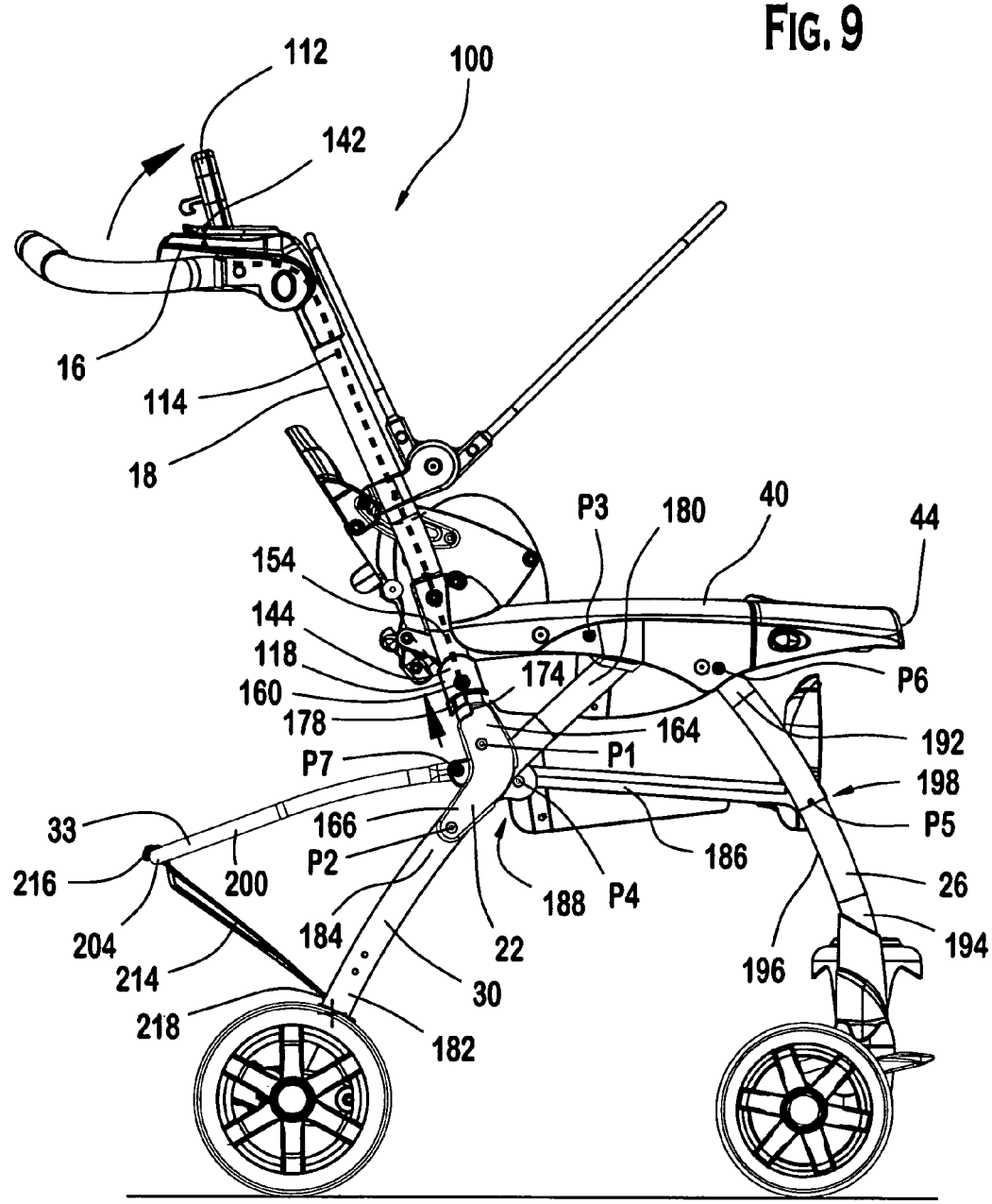
FIG. 9 is a right side view of the stroller illustrating the handle actuator pivoted away from the operator tray and a side locking member disengaged from a complimentary portion of a rail connector.

FIGS. 3 and 6-10 illustrate the operator tray 16 and folding actuating assembly 100 of the stroller 10 of the present invention (FIG. 9). Tray 16 preferably includes right and left securing arms 102, 104 to secure the tray 16 to the right and left handle support rails 18, 20. Tray 16 includes at least one recessed compartment 106 to hold a cup or other container, and a storage compartment 108 that can be concealed by a lid 110. Actuating assembly 100 preferably includes actuator 112, right and left cables 114, 116, and right and left slidable locking members 118, 120. Actuator 112 is preferably pivotally connected to tray 16 at pivot point 123 (FIG. 8). Actuator 112 includes upper and lower surfaces 122, 124. Lower surface 124 includes a pair of opposed side slots 126, 128. Actuator 112 further defines a slot 130 between the upper and lower surfaces 122, 124 facing the pivot point 123. A spring biased release mechanism 131 having a pair of opposed latches 132, 134 is secured between the upper and lower surfaces 122, 124 of the actuator 112 (FIG. 7). An exposed portion 136 of the release mechanism 131 extends through slot 130 for user accessibility (FIG. 3). Latches 132, 134 extend through slots 126, 128 of the lower surface 124 of the actuator 112 (FIGS. 6 and 7), and are adapted to securely engage the operator tray 16 through opposed slots 138, 140 in the operator tray 16 to secure the handle 112 to the operator tray 16 (FIGS. 6 and 8). In a resting state, actuator 112 is substantially flush with and engaged to the operator tray 16. A user can depress the exposed portion 136 of the actuator 112 to slide latches 132, 134 to release the engagement between latches 132, 134 and the operator tray 16 in order to rotate the actuator 112 upwardly by approximately 90 degrees.

Referring to FIG. 6-9, the right and left cables 114, 116 of actuating assembly 100 have first and second ends 142, 144. Working from the first end 142 to the second end 144 of each cable, 114, 116, the first end 142 of each cable 114, 116 is secured to the actuator 112 between the upper and lower surfaces 122, 124 of the actuator 112. Each cable 114, 116 extends from the interior of the actuator 112 through one of a pair of opposed apertures 146, 148 in the lower surface 122 of the actuator 112 and enters the interior of the operator tray 16 through one of a pair of opposed apertures 150, 152 in the operator tray 16. Each of the opposed cables 114, 116 preferably extends from the interior of the operator tray 16 into the interior of a respective handle support rail 18, 20 via the upper portion 72, 74 of each handle support rail 18, 20. Each cable 114, 116 preferably extends through its respective handle support rail 18, 20 to a bottom portion 154, 156 of the handle support rails 18, 20 where the cables 114, 116 are attached to slidable locking members 118, 120, respectively (FIGS. 9 and 10).

The connection between slidable locking member 118 and cable 114 will be discussed with reference to FIGS. 9 and 10; however, the connection between slidable locking member 120 and cable 116 is the same. Slidable locking member 118 contains a pair of opposed apertures 158 (only one being shown) to receive a fastner 160 which extend through an ovate aperture 162 in the bottom portion 154 of handle support rail 18 to secure slidable locking member 118 to handle support rail 18. Cable 114 is also coupled to fastner 160. Slidable locking member 118 is biased, by a spring or other mechanism, to be positioned at the lower portion of ovular aperture 162. When a user pivots actuator 112 upwardly as shown in FIGS. 6, 8, and 9 to fold the stroller 10, tension applied to cable 114 causes it to be pulled upwardly, and, thereby causes slidable locking member 118 to slide upwardly along ovate aperture 162. When actuator 112 is returned to rest position (FIG. 3), slidable locking member 118 returns to the lower portion of ovate aperture 162.

Figure 10:
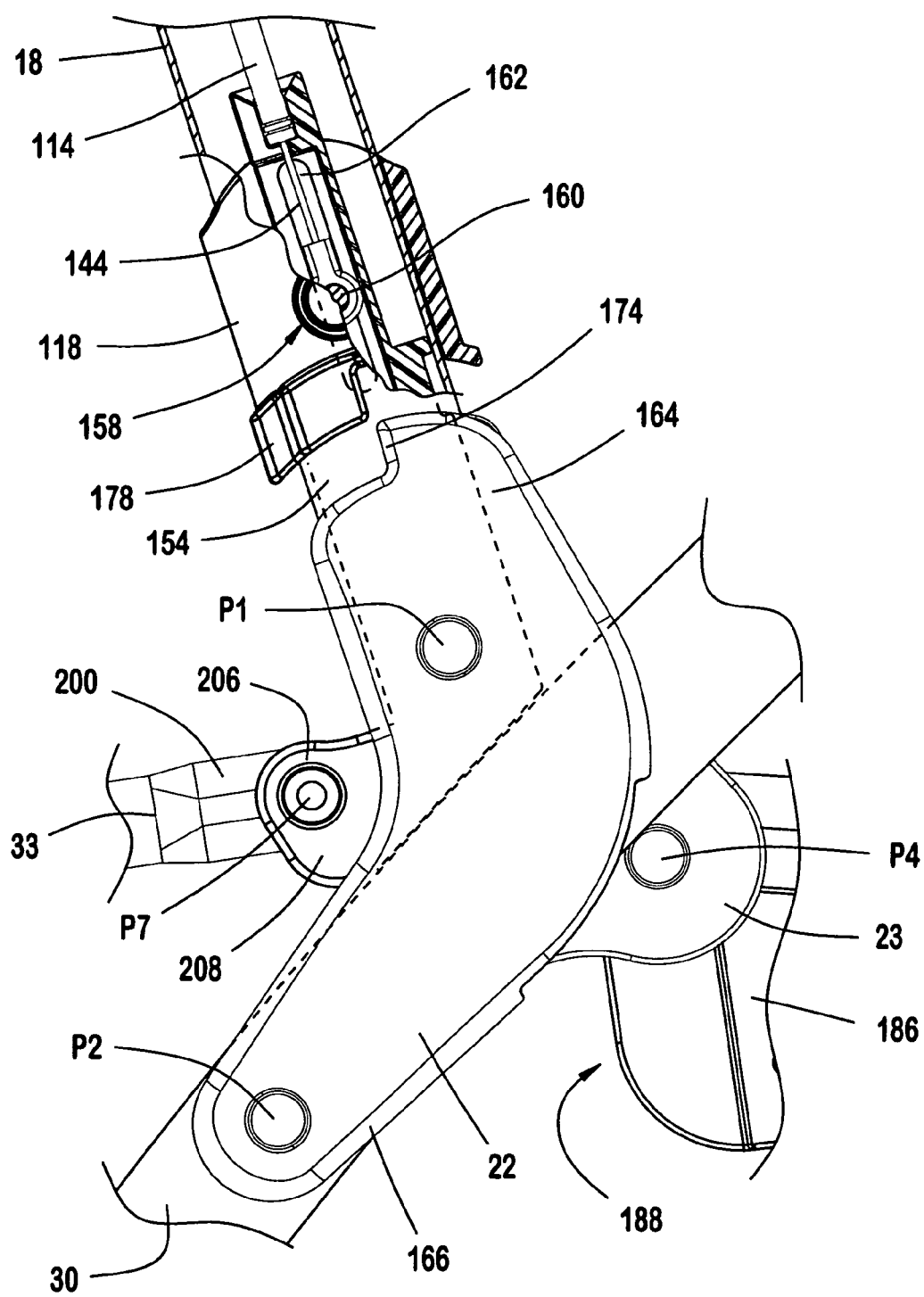
FIG. 10 is an enlarged view of the side lock and rail connector of FIG. 9.
Figure 11:
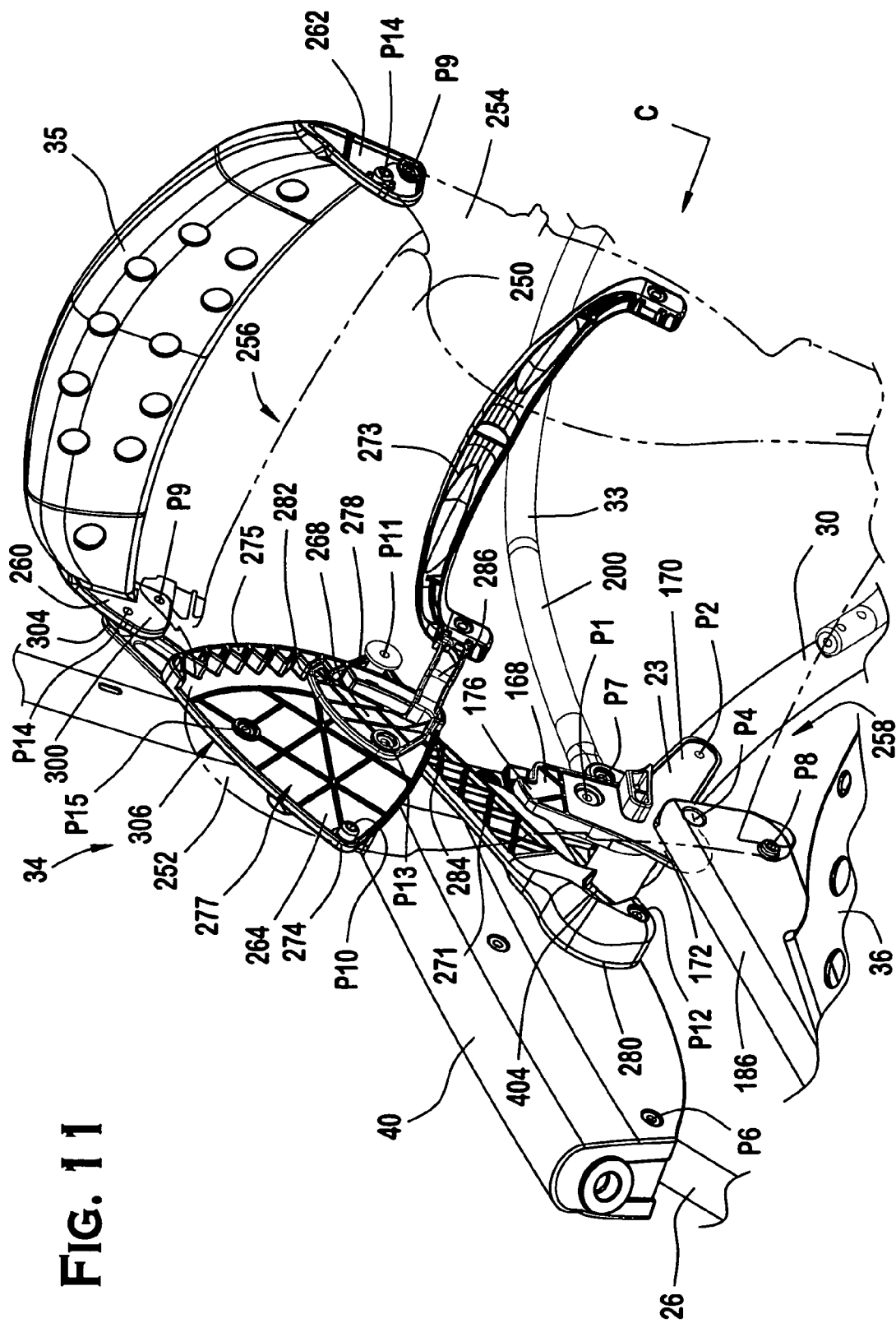
FIG. 11 is a fragmentary view of FIG. 1 with the seat back member in phantom to show the back support assembly of the interior right side with the right side pivot connections in the condition for use.

Referring still to FIGS. 9 and 10, the folding of stroller 10 will be described with reference to the folding structures on the right side of the stroller; the structures on the left side being the mirror image. The bottom portion 154, 156 of each handle support rail 18, 20 is preferably secured to a first pivot point $P_1$ on each rail connector 22, 23, 24, 25. Outer rail connector 22 is preferably boomerang shaped, and has upper and lower ends 164, 166, respectively. Inner rail connector 23 is substantially angular shaped and has an upper end 168, a lower end 170, and central portion 172 (FIG. 11). The upper ends 164, 168 of rail connectors 22 and 23 both have an abutting projection 174, 176 configured to abut a complimentary abutting projection 178 on the slidable locking member 118 when the slidable locking member 118 is in the rest condition. This engagement between the slidable locking members 118, 120 and the rail connectors 22, 23, 24, 25 keeps the stroller 10 locked in the unfolded condition.

Referring to FIG. 9-11, rear leg rails 30, 32 each include an upper end 180, a lower end 182, and a central portion 184. The lower ends 166, 170 of rail connectors 22, 23, respectively, are pivotally secured to the central portion 184 of rear leg rail 30 about pivot point $P_2$. Rail connectors 24, 25 are pivotally secured to rear leg rail 32 in the same manner. The upper end 180 of rear leg rails 30, 32 are pivotally coupled to right and left side arms 40, 42, respectively, at pivot points P3 (FIG. 9).

Figure 12:
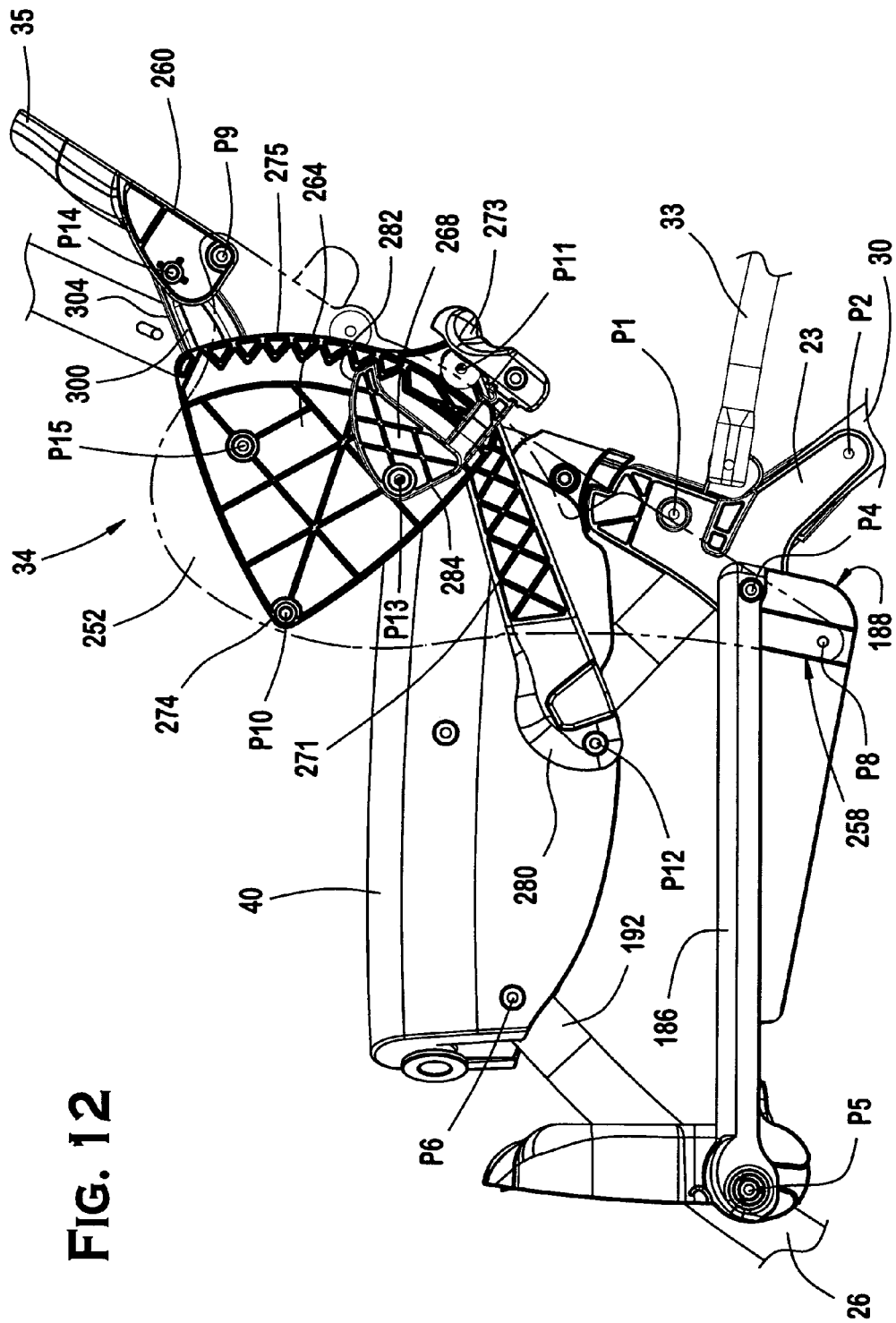
FIG. 12 is an enlarged fragmentary view from the perspective of arrow C in FIG. 11.

The central portion 172 of inner rail connector 23 is pivotally connected to a right side portion 186 at a rear end 188 of seat 36 at pivot point $P_4$ (FIGS. 11 and 12). Inner rail connector 25 is pivotally secured to a left side portion 190 of seat 36 in the same manner.

Front leg rails 26, 28 each include an upper end 192, a lower end 194, and a central portion 196 therebetween. A front end 198 of seat 36 is pivotally secured to the central portions 196 of front leg rails 26, 28 at pivot points $P_5$ (FIG. 9). The upper ends 192 of front leg rails 26, 28 are each pivotally secured to right and left side arms 40, 42 at pivot points $P_6$. Right and left side arms 40, 42 further include a front and rear end 230, 232. The rear end 232 of right and left side arms 40, 42 are pivotally coupled to respective securing projections 234, 236 mounted on the right and left handle support rails 18, 20 to permit the right and left side arms 40, 42 to pivot about pivot point $P_0$ when the stroller 10 is folded (FIG. 13).

U-shaped cross member 33 preferably has right and left arm portions 200, 202 and a central portion 204 (FIG. 2). The right and left arm portions 200, 202 are each preferably pivotally secured to a first end 206 of an L-shaped extending member 208 at pivot points $P_7$ (FIGS. 9, 10, 17, 18). A second end 210 of each L-shaped extending member 208 is secured to the respective right and left handle support rails 18, 20. A cross rail support 212 is fixedly secured to the lower end 182 of each rear support rail 30, 32. A generally vertical connector 214 having a first end 216 connected to the central portion 204 of the U-shaped cross member 33 and a second end 218 connected to the cross rail support 212 to locate U-shaped cross member 33 at a desired length from the cross rail support 212 (FIGS. 2, 9, 13, 15) and prevents pivoting about pivot points $P_7$.

When the stroller 10 is an unfolded condition, both slidable locking members 118, 120 are in rest position with their respective abutting projections 178 forming secure complimentary engagements with projections 174, 176 of the respective rail connectors 22, 23, 24, 25. This engagement between abutting projections 178 of the slidable locking members 118, 120 and projections 174, 176 of the respective rail connectors 22, 23, 24, 25 prevents the aforementioned components from pivoting about any of the pivot points $P_0$-$P_6$. Pivot points $P_0$-$P_6$ on the right side of stroller 10 are mirror images of pivot points $P_0$-$P_6$ on the left side of stroller 10.

When the stroller 10 is being folded, slidable locking members 118, 120 are pulled upwardly, as discussed above, to disengage the abutting projections 178 from abutting projections 174, 176 of the respective rail connectors 22, 23, 24, 25 (FIGS. 9 and 10). A user can pivot the aforementioned structures of the stroller 10 about their respective pivot points ($P_0$-$P_6$) to place the stroller 10 in the folded condition (FIGS. 13 and 15) by either pulling upwardly on tray 44 or by stepping on the central portion 204 of U-shaped cross member 33 as shown in FIG. 13. When the stroller 10 is completely folded it can stand in a substantially vertical position resting on U-shaped cross member 33 and rear wheel assemblies 52, 54 (FIG. 15).

Figure 17:
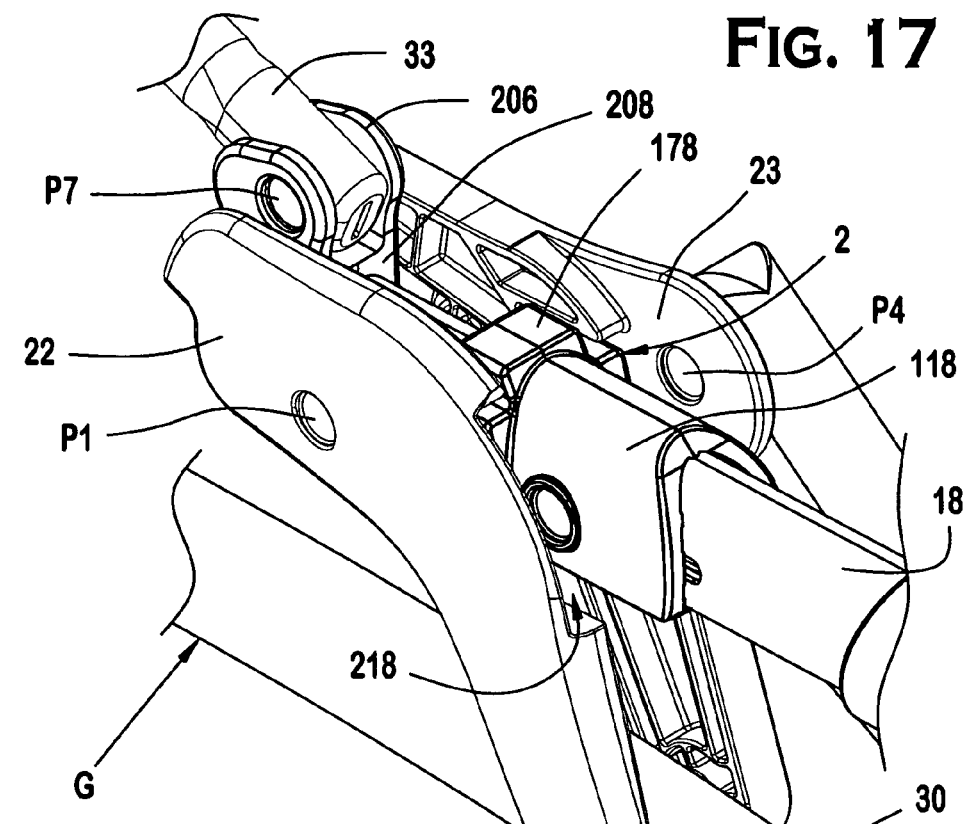
FIG. 17 is an enlarged fragmentary view of the right slidable locking member and rail connectors from the perspective of arrow F in FIG. 15.
Figure 18:
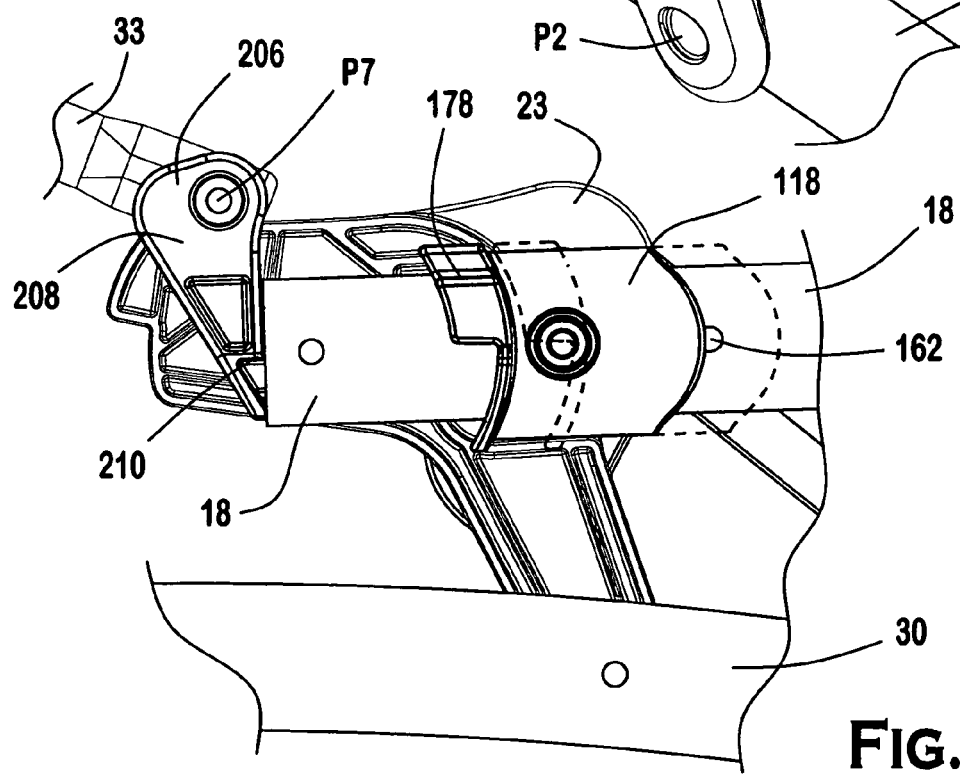
FIG. 18 is a side view from the perspective of arrow G in FIG. 18 with the outer rail connector removed.

Referring to FIG. 17 and 18, when the stroller 10 is in the completely folded condition, each slidable locking member 118, 120 again returns to the downward or relaxed position on ovate aperture 162. The abutting projection 178 of slidable locking member 118 then engages groove 220 on outer rail connector 22 and groove 222 on inner rail connector 23 to lock the stroller in the folded condition (slidable locking member 120 engages rail connectors 24, 25 in a similar manner). In order to return the stroller 10 to the unfolded condition, a user depresses the actuator 112 to move locking members 118, 120 upwardly along ovate aperture 162 and away from grooves 220 and 222.

FIGS. 11-16 illustrate the memory position feature of the reclinable back support assembly 34 of the stroller 10. The reclinable back support assembly 34 includes a seat back member 250 (shown in phantom in FIGS. 11-12 and 14-16) having right and left opposed side walls 252, 254 and upper and lower ends 256, 258. The lower end 258 of seat back member 250 is pivotally secured to the right and left side portions 186, 188 at the rear end 188 of seat 36 at pivot points $P_8$ (FIG. 11). The upper end 256 of seat back member 250 is pivotally secured to the right and left side walls 260, 262 of head support 35 at pivot points $P_9$.

Referring to FIGS. 11 and 12, the reclinable back support assembly 34 further includes right and left recline members 264, 266, right and left locking members 268, 270, right and left 271, 272 securing arms, and a spring biased control member 273. While only the right side of the reclinable back support assembly 34 is shown in these Figures, one of ordinary skill in the art would understand that the left side of the reclinable back support assembly is a mirror image of the right side.

Right and left recline member 264, 266 are substantially triangular shaped and have an angled front end 274, a curved rear end 275, an outer side 276 and inner side 277. The inner side 277 of the angled front end 274 of each recline member 264, 268 is pivotally secured to the respective right and left side walls 252, 254 of the seat back 250 at pivot points $P_{10}$. The outer side 276 of the rear end 275 of each recline member 264, 266 is pivotally secured to a rear end 278 of respective right and left securing arms 271, 272 at pivot points $P_{11}$. Right and left securing arms 271, 272, each have a front end 280 that is pivotally secured to the respective right and left side arms 40, 42 at pivot points $P_{12}$.

Referring to FIGS. 11 and 12, a right and left support member 300, 302 pivotally connects the right and left recline members 264, 266 to the respective right and left side walls 260, 262 of head support 35. Each support member 300, 302 has an upper end 304 and a lower end 306. The upper end 304 of each support member 300, 302 is pivotally secured to a respective one of the right and left side walls 260, 262 of head support 35 at pivot points $P_{14}$. The lower end 306 of each support member 300, 302 is pivotally secured to a respective one of the right and left recline members 264, 266 at pivot points $P_{15}$.

Right and left locking members 268, 270 are each pivotally secured to the inner side of 277 of the respective right and left recline members 264, 266 at pivot points $P_{13}$. Right and left locking member 268, 270 each have an upper end and a lower end 282, 284. The lower end 282 of each locking member 268, 270 has an extending member 286, 288 that extends rearwardly past a rear side 290 of seat back 250. Each extending member 286, 287 is coupled to a respective end of the spring biased control member 273 which is positioned adjacent to the rear side 290 of the seat back 250. The spring biased control member 273 is preferably biased downwardly by at least one spring 296.

Right and left recline members 264, 266 each have a plurality of adjustment grooves 292 positioned along the curved rear end 275. Right and left locking members 268, 270 each have an engaging pawl 294 to engage a respective one of the plurality of adjustment grooves 292 on the curved rear end 275 of the left and right recline members 264, 266.

In order to recline seat back member 250, a user can pull spring biased control member 273 upwardly to cause right and left locking members 264, 266 to pivot about pivot points $P_{13}$ and disengage engaging pawls 294 from the respective grooves 292 of the recline members 264, 266. The seat back member 250 can be reclined into a plurality of positions by pivoting the seat back member 250 to a desired position and releasing the tension on spring biased control member 273. The engaging pawls 294 of the right and left locking members 264, 266 then securely reengage a pair of adjustment grooves 292 at the desired position.

Referring to FIG. 2, the rear side 290 of seat back member 250 further includes two opposed side walls 310, 312. Each side wall 310, 312 has a curved surface 314, 316. A circular projection or cam follower 318, 320 is secured to the right and left recline members 264, 266 adjacent to the rear end 275 of the recline members 264, 266 to engage the curved surfaces 314, 316 of side walls 310, 312 and support the seat back member 250 in the plurality of reclinable positions.

Referring to FIGS. 13-16, when the stroller 10 is folded, the pawls 294 remain engaged in the same respective adjustment grooves 292 of the recline members 264, 266 as they were prior to being folded. Similarly, when the stroller 10 is unfolded, the pawls 294 remain engaged in the same respective adjustment grooves 292 of the recline members 264, 266 as they were prior to being folded. Therefore, the seat back member 250 retains the same reclinable position as the stroller 10 is taken from the opened, to folded, and back to opened conditions.

Figure 19:
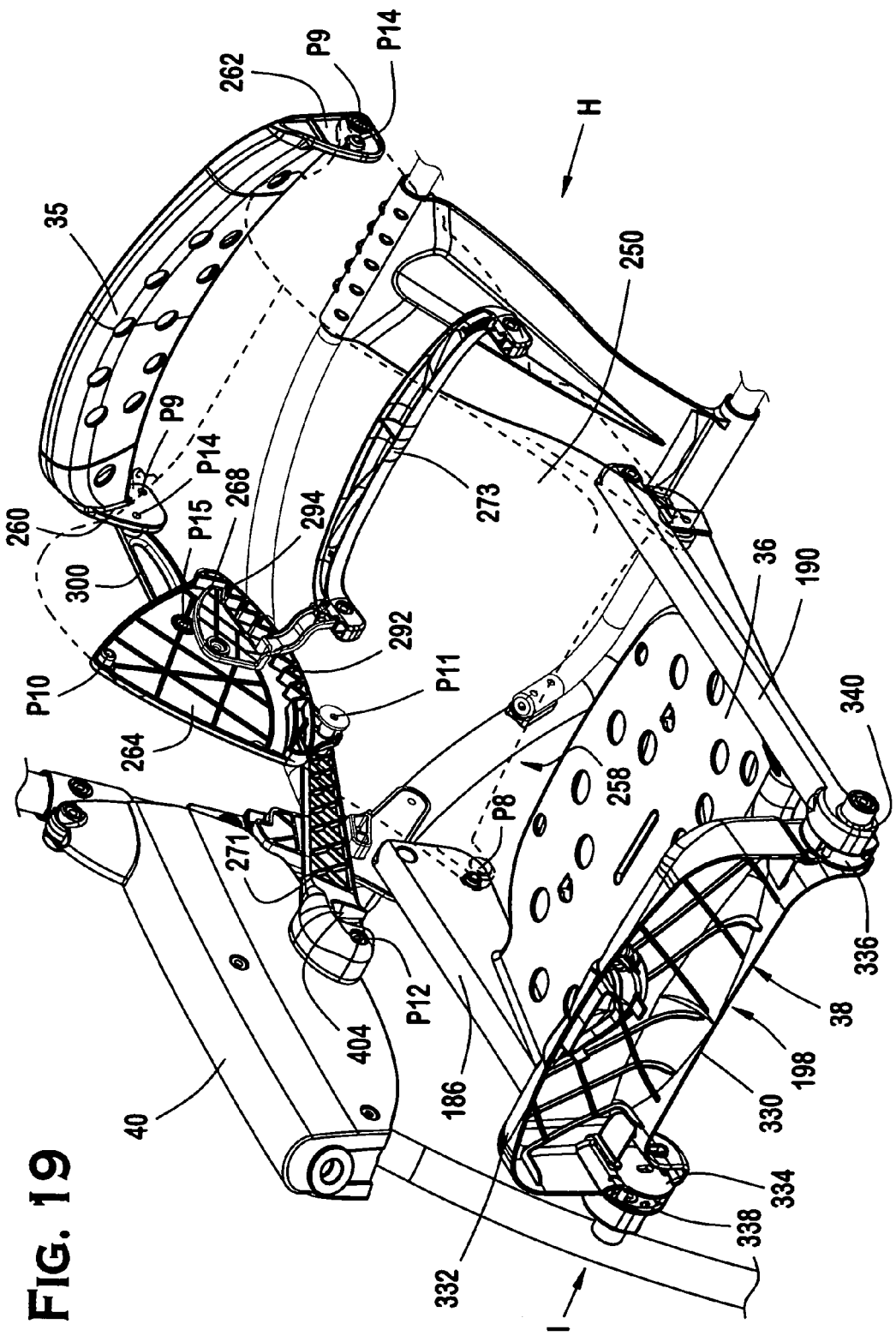
FIG. 19 is a fragmentary view of the stroller with the seat back member in phantom to show the back support assembly of the interior right side in a fully reclined condition.
Figure 20:
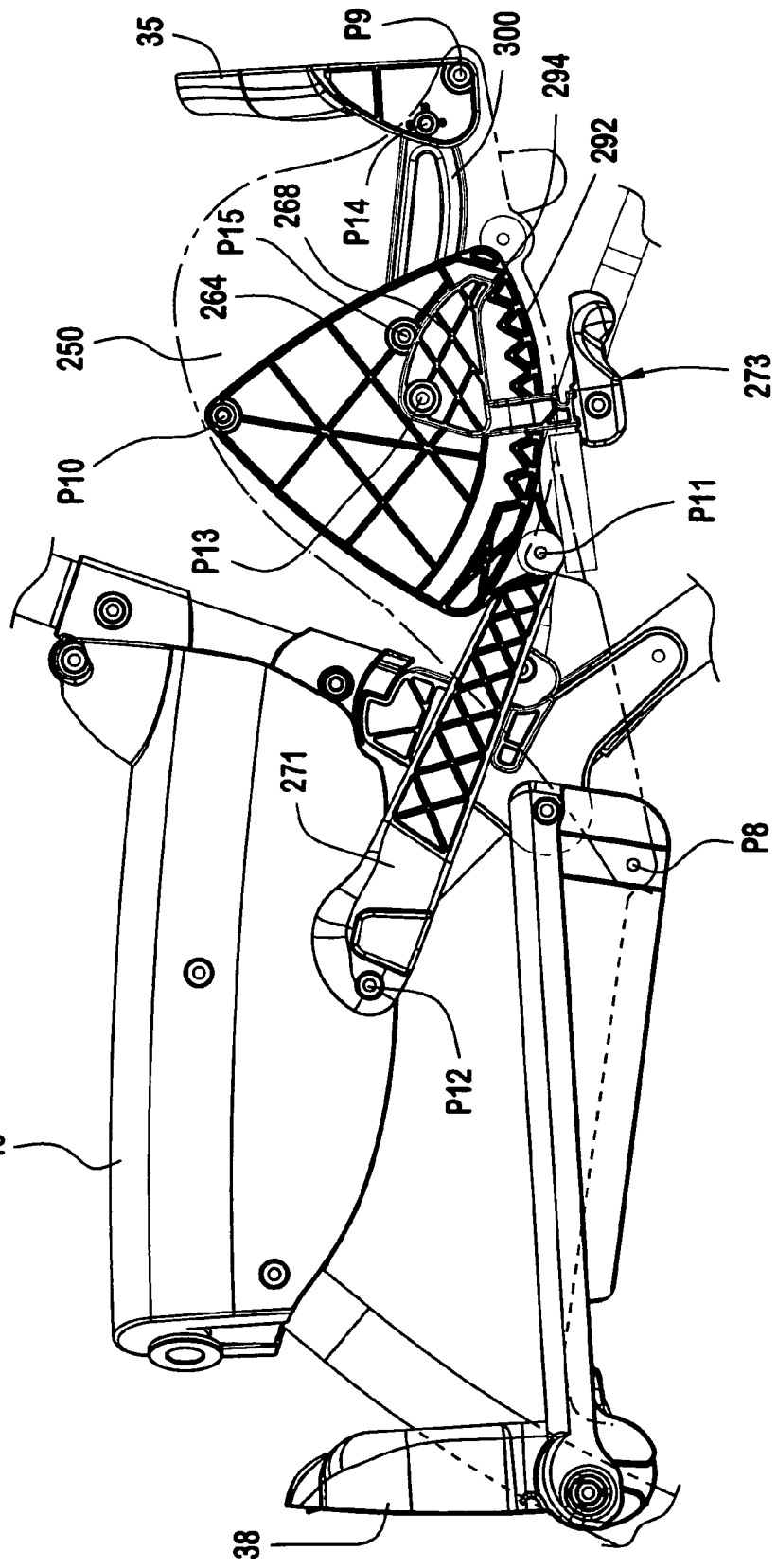
FIG. 20 is an enlarged fragmentary view from the perspective along the arrow H in FIG. 19.

Referring to FIGS. 19 and 20, the seat back member 250 can be reclined
to be in a substantially horizontal plane with seat 36 by adjusting the engagement of pawls 294 with adjustment grooves 292 of the right and left recline members 264, 266, as described above. When the seat back member 250 is reclined, recline members 264, 266 pivot about pivot points $P_{10}$ and $P_{11}$ causing right and left securing arms 271, 271 to pivot about pivot points $P_{12}$. The lower end 258 of the seat back member 250 can then pivots about pivot points $P_8$ to be in a substantially horizontal plane with seat 36.

Still with reference to FIGS. 19 and 20, as seat back member 250 is reclined, head support 35 is arranged so that it remains in a substantially vertical orientation with respect to the ground. When seat back member 250 is reclined, support members 300, 302 pivot about pivot points $P_{15}$ and head support 35 pivots about pivot points $P_9$ and $P_{14}$ and remains in a substantially vertical orientation. When seat back member 250 is reclined to be in a substantially horizontal plane with seat 26, the head support 35 acts as a barrier to prevent a child from slipping out of the rear end of the stroller 10 and forms a bed-like structure.

With reference to FIGS. 1 and 19-22, leg support 38 has first and second ends 330, 332. The first end 330 includes right and left securing assemblies 334, 336 that are pivotally secured to the front end 198 of each respective right and left side portion 186, 190 of seat 36 (FIG. 19). The front end 198 of the right and left side portions 186, 190 of seat 36 include respective right and left receiving hubs 338, 340 that engage the right and left securing assemblies 334, 336 of leg support 368. A pivotal engagement between right and left securing assemblies 334, 336 of leg support 38 and the right and left receiving hubs 338, 340 of seat 36 permit the leg support 38 to be pivoted up to 180 degrees.

Figure 21:
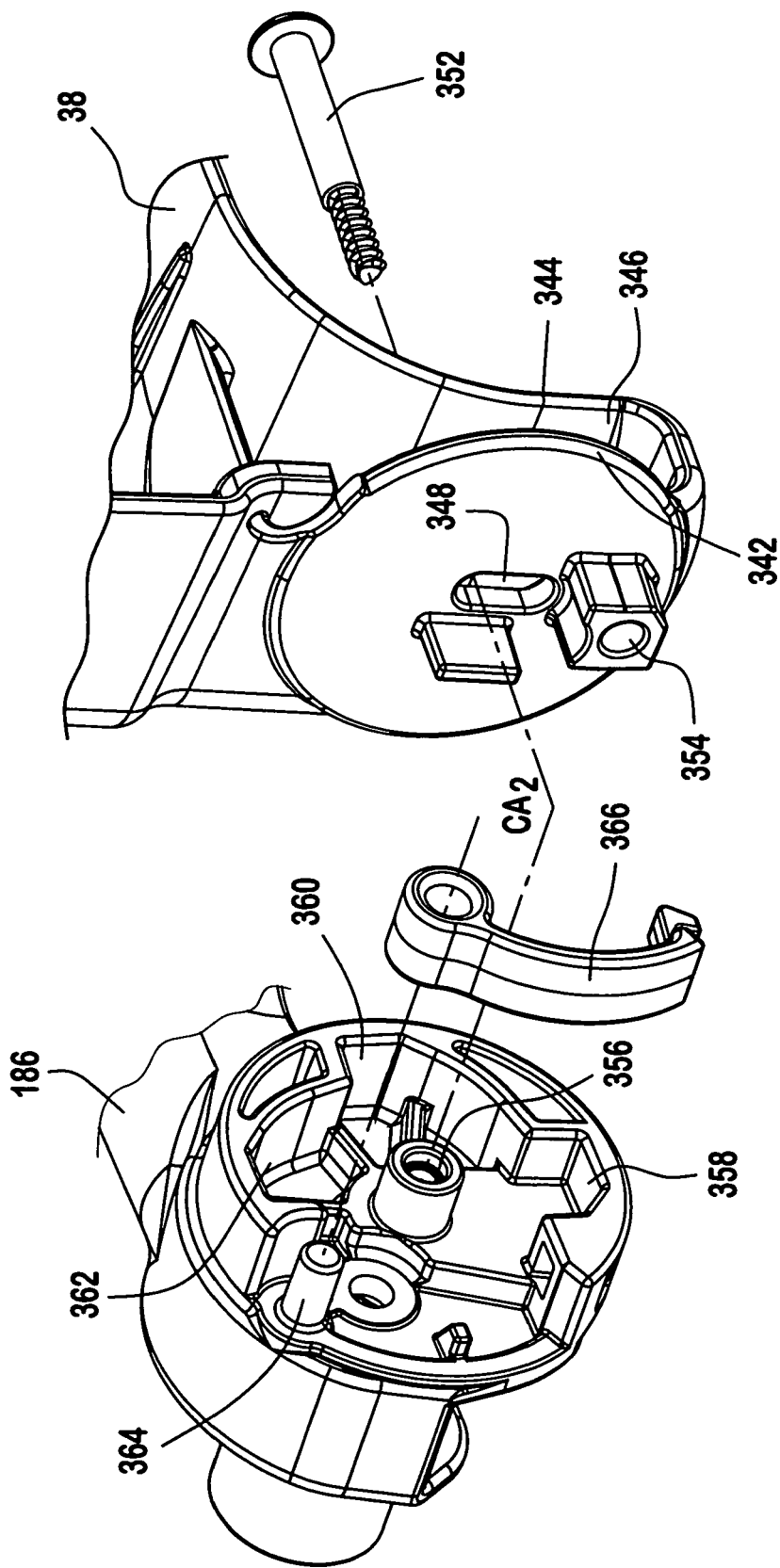
FIG. 21 is an exploded view of the pivotal connection between right side of the stroller seat and the leg support member from the perspective of arrow I in FIG. 19.
Figure 22:
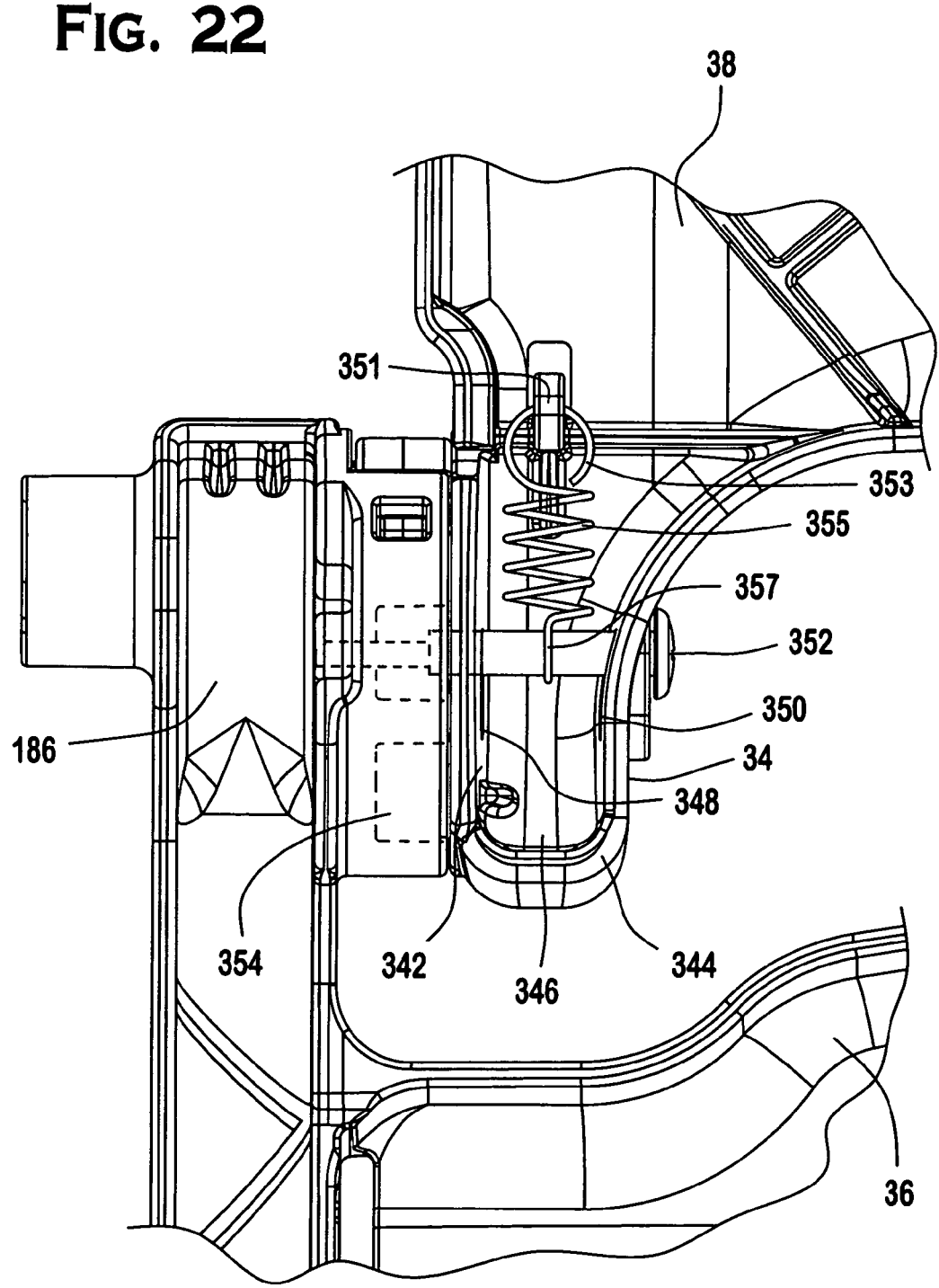
FIG. 22 is a fragmentary bottom view of the pivotal connection between right side of the stroller seat and the leg support member from the perspective of arrow w J in FIG. 1.

FIGS. 21 and 22 illustrate the pivotal engagement between the right securing assembly 334 of leg support 38 and right receiving hub 338 of seat 36; the pivotal engagement between the left securing assembly 336 of leg support 38 and left receiving hub 340 of seat 36 being mirror images. The right securing assembly 334 includes outer and inner surfaces 342, 344 forming a groove 346 therebetween. Both the outer and inner surfaces 342, 344 define ovate apertures 348, 350 along a central axis $CA_2$ for receiving a fastner 352. A hook 351 is mounted within groove 346 to secure a first end 353 of a spring 355. Spring 355 also includes a second end 357 secured to fastner 352 within groove 346. The outer surface 342 of right securing assembly 334 further includes a stop projection 354. The right receiving hub 338 of the seat 36 includes a central projection 356 extending along the central axis $CA_2$ and adapted to receive fastner 352. The right receiving hub 338 is substantially circular shaped and includes three (3) grooves 358, 360, 362 positioned within a 180 degree portion along the circumference of the hub 338.

The stop projection 354 of the outer surface 342 of each securing assemblies 334, 336 positioned to engage one of the three (3) grooves 358, 360, 362 of the respective receiving hub 338, 340 to pivot the leg support 38 about the central axis $CA_2$ in one of three positions. Receiving hubs 338, 340 further include a circular projection 364 adapted to secure an abutting surface 366 which prevents the stop projection 354 from rotating greater than 180 degrees about each receiving hub 340, 340.

Leg support 38 includes a pull tab 368 to allow a user to grasp the leg support 38 when pivoting the leg support 38 (FIG. 1). Spring 355 biases the leg support 38 toward seat 36. The leg support 38 can pivoted about $CA_2$ by pulling the leg support 38 away from seat 36, which permits the leg support 38 to slide in a perpendicular direction to the central axis $CA_2$ along ovate apertures 348, 352 and relieve the engagement between the stop projection 354 of the outer surface 342 of each securing assemblies 334, 336 and a respective one of the three (3) grooves 358, 360, 362 of the receiving hubs 338, 340. A user can then pivot the leg support 38 along a 180 degree axis and reposition the stop projection 354 to another one of the three (3) grooves 358, 360, 362 of the receiving hub 338, 340. When the leg support 38 is pivoted such that second end 332 is in an upward position (FIG. 19), it forms a barrier to prevent a child from falling out of the front portion of the stroller 10.

Figure 25:
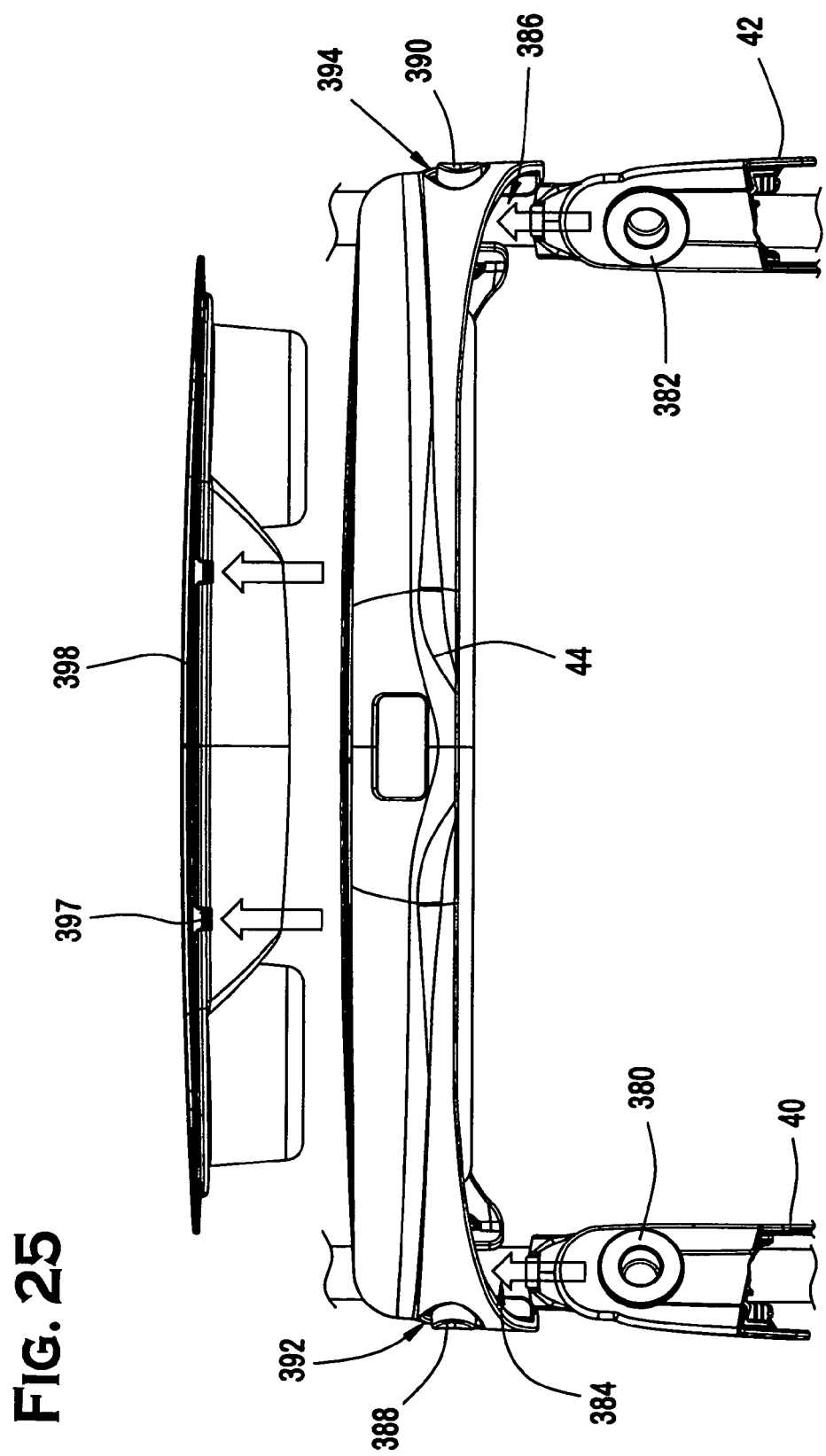
FIG. 25 illustrates the removable tray insert for the child tray of the stroller and the child tray in the fully disengaged condition.
Figure 26:
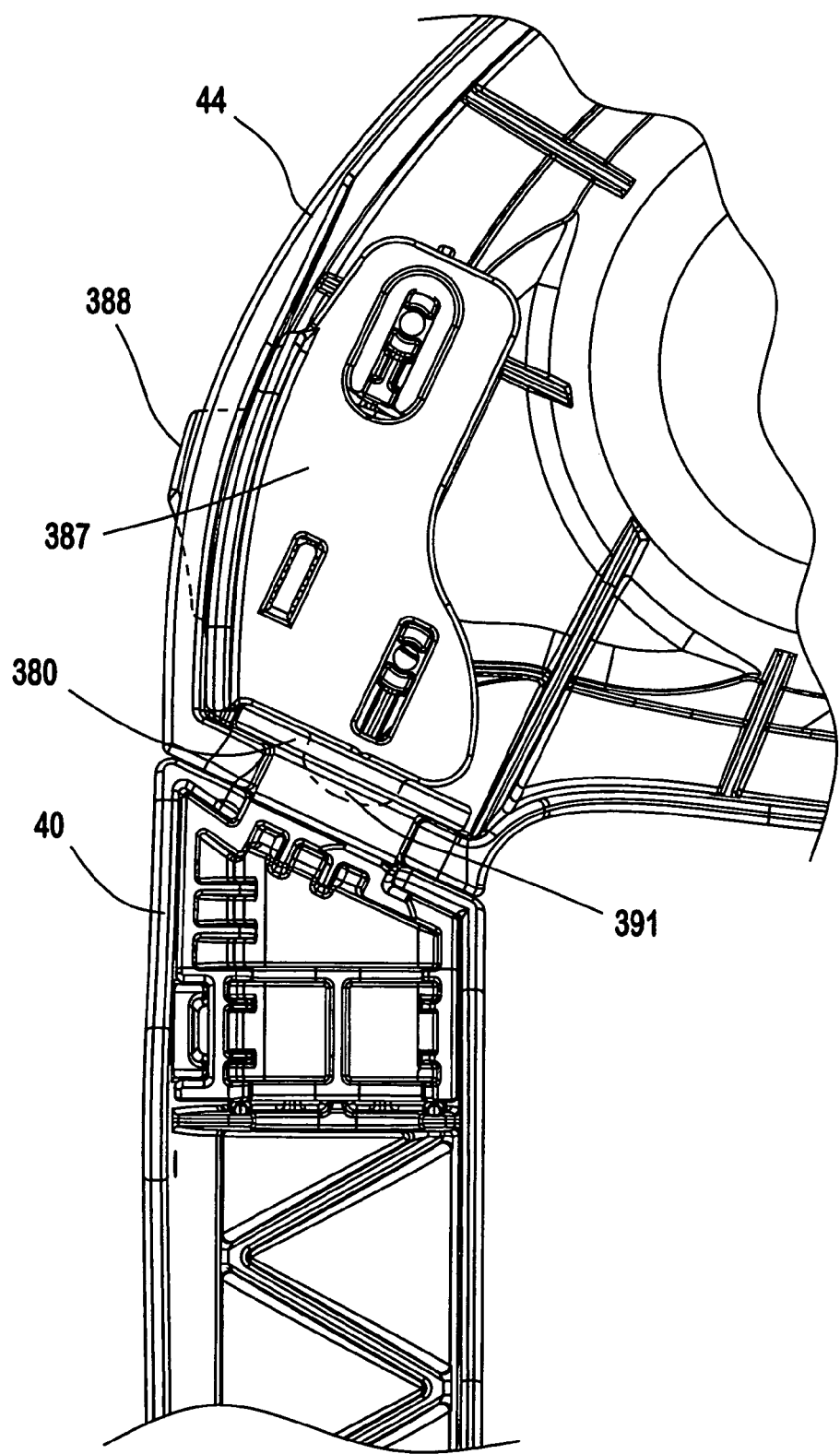
FIG. 26 is a bottom view of engagement between the right side arm of the stroller and the child tray.

As shown in FIGS. 1 and 23-26, a child's tray 44 is removably secured to the right and left side arms 40, 42. The front end 230 of right and left side arms 40, 42 each include a circular mounting protrusion 380, 382. The removable child's tray 44 has left and right slots 384, 386 configured to be secured to the circular mounting protrusions. Left and right tray releases 387, 389 are mounted to the tray 44 and have buttons 388, 390 which extend through a pair of opposed side apertures 392, 394 in the tray 44 to assist releasing the engagement between the slot 384 or 386 of tray 44 from mounting protrusion 380 or 382 of side arms 40, 42 (FIG. 26). As shown in FIGS. 23-26, the tray 44 can be disengaged from either or both of the side arms 40, 42 when a user depresses one or both buttons 388, 390 of tray releases 387, 389 which causes a cam surface 391 mounted to each tray release 387, 389 to push against the respective mounting protrusions 380, 382 and slide tray 44 away from side arms 40, 42. When the tray 44 is disengaged from only one of the side arms 40 or 42, the tray can pivot about the mounting protrusion 380 or 382 of the other side arm 40 or 42 (FIGS. 23 and 24). If both buttons 388, 390 of the tray releases 387, 389 are depressed, the child's tray 44 can be completely disengaged from both side arms 40, 42 (FIG. 25).

As shown in FIGS. 1 and 25, the child's tray 44 may have a removable tray insert 396. In the installed condition, clips 397, 398 secure the removable tray insert 396 to the child's tray 44. Tray insert 396 may be removed by a user by placing his or her finger in either of gaps 400, 402 and pulling the tray insert 396 in an upward direction (FIG. 1).

Referring to FIGS. 1, 11, and 19, the front end 280 of right and left securing arms 271, 272 of stroller 10 can further include opposed car seat receiving slots 404, 406 to engage a complimentary securing mechanism on a car seat 405.

Other features of the present invention can include ergonomic handle grips 408, 410 (FIG. 1); a canopy frame 412 (FIG. 1); and a one-touch rear braking assembly 414 (FIG. 2).

What is claimed is:

1. A foldable stroller comprising:
a foldable stroller frame defining front and rear ends and right and left sides, the frame comprising:
at least one front leg and right and left rear legs, each leg having a wheel mounted thereto;
an operator handle having right and left support rails extending therefrom, the right and left support rails pivotally coupled to a respective one of the right and left rear legs;
at least one locking assembly movably mounted on at least one of the right and left support rails, the at least one locking assembly biased toward a locking position to secure the right and left support rails at a fixed position relative to the right and left rear legs;
an upper tray mounted to the right and left support rails, the upper tray defining a groove; and
an actuator control handle received within the groove and positioned in a substantially horizontal plane with an upper surface of the upper tray, the actuator control handle pivotally connected to the upper tray and rotatable relative to the upper tray about the pivotal connection, the actuator control handle coupled to the at least one locking assembly;
wherein the actuator control handle is rotatable away from the upper surface of the upper tray to disengage the at least one locking assembly from the pivotal coupling between the rear legs and support rails and permits the right and left rear legs to pivot relative to the right and left support rails to fold the stroller.

2. The foldable stroller of claim 1 wherein a cable connects the actuator control handle to the at least one locking assembly.

3. The foldable stroller of claim 2 wherein the right and left support rails are hollow tubular structures defining an interior passage therethrough and the cable extends through the interior passage of at least one of the right and left support rails to the at least one locking assembly.

4. The foldable stroller of claim 1 wherein the at least one locking assembly is slidable along the at least one of the right and left support rails and pivotal movement of the actuator control handle urges the at least one locking assembly to slide away from at least one of the pivotal couplings between the right and left support rails and the right and left rear legs.

5. The foldable stroller of claim 1 further comprising right and left rail connectors having a first end, a second end, a central portion therebetween, the first end of the right and left rail connectors being pivotally secured to the right and left support rails, the second end of the right and left rail connectors being pivotally secured to the right and left rear legs.

6. The foldable stroller of claim 5 wherein each of the right and left rail connectors further comprise inner and outer rail connectors.

7. The foldable stroller of claim 5 further comprising right and left locking assemblies, wherein the right and left locking assemblies are biased toward engagement with the first ends of the right and left rail connectors.

8. The foldable stroller of claim 7 wherein the right and left locking assemblies are slidably secured to the right and left support rails and pivotal movement of the actuator control handle urges the right and left locking assemblies to slide away from first end of the right and left rail connectors when the stroller is folded.

9. The foldable stroller of claim 7 wherein the central portion of each right and left rail connector further defines a groove to receive the locking assemblies to secure the frame in a folded condition.

10. The foldable stroller of claim 1 wherein the actuator control handle is pivoted upwardly to unlock the at least one locking assembly.

11. The foldable stroller of claim 10 wherein the actuator control handle includes:
- a pair of locking clips that are secured to the upper tray when the frame is in an unfolded condition to prevent movement of the actuator; and
- a release button that releases the locking clips from the upper tray and frees the actuator for movement.

12. The foldable stroller of claim 10 further comprising:
- a locking assembly secured to each of the support rails; and
- a cable linking each of the locking assemblies to the actuator control handle;
- wherein the locking assemblies slide on the respective support rails and upward movement of the actuator control handle urges the locking assemblies away from the pivotal couplings between the right and left support rails and the right and left rear legs and allows folding of the frame.

13. The foldable stroller of claim 1 further comprising:
- a U-shaped cross member secured to the left and right support rails adjacent to the pivotal engagement between the right and left support rails and the right and left rear legs;
- wherein a force exerted on the U-shaped cross member facilitates folding of the frame.

14. The foldable stroller of claim 1 further comprising:
- rear braking assemblies movable between a first and second position and configured to engage the rear wheels in the second position; and
- a linking member connecting the rear braking assemblies.

15. The foldable stroller of claim 1, wherein the actuator control handle is rotatable toward the front end of the stroller to fold the stroller.

16. A foldable stroller frame comprising:
- a front leg and right and left rear legs;
- right and left support rails movably coupled to a respective one of the right and left rear legs;
- an operator handle extending between the support rails;
- a locking assembly mounted on one of the support rails and biased toward a locking position that secures the engagement between the support rails and the rear legs;
- an upper tray mounted between the right and left support rails, the upper tray having an upper surface defining a horizontal plane and a lower surface; and
- an actuator handle pivotally connected to and rotatable about the upper tray between first and second positions, the actuator handle positioned to be substantially flush with the horizontal plane of the upper surface of the upper tray in the first position and rotatable away from the horizontal plane of the upper surface of the upper tray in the second position, the actuator handle linked to the locking assembly;
- wherein the support rails are in a fixed position relative to the rear legs when the actuator handle is in the first position, and the support rails are movable relative to the rear legs when the actuator handle is in the second position.

17. The frame of claim 16 wherein the link is a cable.

18. The frame of claim 17 wherein the support rails are hollow tubular structures and the cable extends from the actuator handle through one of the interior passages to the locking assembly.

19. The frame of claim 16 wherein the support rails are hollow tubular structures and the link extends from the actuator handle through one of the interior passages to the locking assembly.

20. The frame of claim 19 wherein movement of the actuator handle between the first and second pivot positions urges the locking assembly away from the secure engagement and allows folding of the frame.

21. The frame of claim 19 wherein the locking assembly slides on the selected support rail and movement of the actuator handle between the first and second positions urges the locking assembly away from the secure engagement and allows folding of the frame.

22. The frame of claim 16 wherein the locking assembly slides on the selected support rail and movement of the actuator handle between the first and second positions urges the locking assembly away from the secure engagement and allows folding of the frame.

23. The frame of claim 16 further comprising support rail connectors having first and second ends with each first end being pivotally secured to respective support rail and each second end being pivotally secured to a respective rear leg.

24. The frame of claim 16 wherein a locking assembly is mounted on each of the support rails and linked to the actuator handle.

25. The frame of claim 24 wherein movement of the actuator handle between the first and second positions urges the locking assemblies away from the secure engagements and allows folding of the frame.

26. The frame of claim 16 wherein the actuator handle includes:
- a pair of locking clips secured to the upper tray when the frame is in an unfolded condition and prevents movement of the actuator handle; and
- a release button that releases the locking clips from the upper tray and frees the actuator handle for movement.

27. A foldable stroller comprising:
- a foldable frame having:
  - a front leg and right and left rear legs;
  - right and left support rails movably coupled to a respective one of the right and left rear legs;
  - an operator handle extending between the support rails;
  - a locking assembly secured to one of the support rails and biased toward a locking position that secures the engagement between the support rails and the rear legs;
  - an upper tray mounted between the right and left support rails; and
  - an actuator, movably connected to the upper tray and linked to the locking assembly, the actuator movable between first and second positions and controls locking and unlocking of the locking assembly; and
- a reclinable back support assembly comprising:
  - a seat back pivotally secured to the frame;
  - a recline guide member pivotally secured to the seat back and having a curved support surface that includes a plurality of grooves corresponding to a plurality of recline positions for the seat back; and at least one locking member pivotally connected to the recline guide member and biased toward engagement with one of the plurality of grooves;

wherein the recline guide member is pivotable relative to the seat back as the seat back is moved between recline positions and the locking member retains its last engagement position with any one of the plurality of grooves when the frame is moved between a folded and unfolded configuration, and the seat back is rotatable toward the seat base when the stroller is folded and retains its last recline position when the stroller is unfolded.

28. A foldable stroller frame comprising:
a front leg and right and left rear legs;
right and left support rails movably coupled to a respective one of the right and left rear legs;
an operator handle extending between the support rails;
a seat base secured to at least one of the support rails and rear legs; and
a reclinable back support assembly comprising:
   a seat back pivotally secured to the frame;
   a recline guide member pivotally secured to the seat back and having a curved support surface that includes a plurality of grooves that define a plurality of recline positions for the seat back; and
   a locking member pivotally connected to the recline guide member and biased toward engagement with one of the plurality of grooves;
wherein the recline guide member is pivotable relative to the seat back as the seat back is moved between recline positions and the locking member retains its last engagement position with any one of the plurality of grooves as the frame is moved between a folded and an unfolded condition, and the seat back is rotatable toward the seat base when the stroller is folded and retains its last recline position when the stroller is unfolded.

29. The frame of claim 28 wherein the locking member includes a biasing element secured to the seat back.

30. The frame of claim 28 wherein the locking member is connected to a spring biased handle extending away from a rear side of the seat back to control the engagement between the locking member and the plurality of grooves.

31. The frame of claim 28 further comprising:
a pair of recline guide members having opposed curved support surfaces with a plurality of grooves; and
a pair of locking members biased toward engagement with a respective one of the plurality of grooves.

32. The frame of claim 28 wherein the seat back reclines to a substantially horizontal plane with the seat base.

33. The frame of claim 28 further comprising:
a head support having right and left ends, each of the right and left ends pivotally coupled to one of the recline guide members and to the seat back;

wherein the head support remains in a substantially vertical orientation with respect to each of the plurality of recline positions of the reclinable back support assembly.

34. The frame of claim 28 further comprising a footboard pivotally secured to a front end of the frame adjacent to the seat base and configured to be pivoted up to 180 degrees.

35. The frame of claim 28 further comprising:
a pair of side arms movably secured to the rear legs and support rails; and
a child's tray removably secured to each of the side arms.

36. The frame of claim 35, wherein the child's tray is pivotally secured to each of the side arms.

37. The frame of claim 35 further comprising a tray insert removably secured to the child's tray.

38. The frame of claim 28 further comprising right and left securing arms, each arm having a groove configured to secure a car seat having complimentary opposed securing projections.

39. The frame of claim 28 further comprising a canopy frame secured to the right and left support rails.

40. A foldable stroller comprising:
a foldable stroller frame defining front and rear ends and right and left sides, the frame comprising:
   at least one front leg and right and left rear legs, each leg having a wheel mounted thereto;
   an operator handle having right and left support rails extending therefrom, the right and left support rails pivotally coupled to a respective one of the right and left rear legs;
at least one locking assembly movably mounted on at least one of the right and left support rails, the at least one locking assembly biased toward a locking position to secure the right and left support rails at a fixed position relative to the right and left rear legs;
an upper tray mounted to the right and left support rails, the upper tray defining a groove;
an actuator handle received within the groove and positioned in a substantially horizontal plane with an upper surface of the upper tray, the actuator control handle pivotally connected to the upper tray and rotatable relative to the upper tray about the pivotal connection; and
a cable having a first end secured to the actuator handle and a second end secured to the at least one locking assembly;
wherein rotation of the actuator handle disengages the at least one locking assembly from the pivotal coupling between the rear legs and support rails and permits the right and left rear legs to pivot relative to the right and left support rails to fold the stroller.

* * * * *